US012378800B2

(12) United States Patent
Kawai et al.

(10) Patent No.: US 12,378,800 B2
(45) Date of Patent: Aug. 5, 2025

(54) LOCK APPARATUS FOR VEHICLE OPEN/CLOSE BODY

(71) Applicant: ANSEI CORPORATION, Obu (JP)

(72) Inventors: Hiroshi Kawai, Obu (JP); Hidenobu Hayashi, Obu (JP)

(73) Assignee: ANSEI CORPORATION, Obu (JP)

( * ) Notice: Subject to any disclaimer, the term of this patent is extended or adjusted under 35 U.S.C. 154(b) by 314 days.

(21) Appl. No.: 18/170,052

(22) Filed: Feb. 16, 2023

(65) Prior Publication Data

US 2023/0392418 A1 Dec. 7, 2023

(30) Foreign Application Priority Data

Jun. 6, 2022 (JP) ................................ 2022-091838

(51) Int. Cl.

*E05B 81/14* (2014.01)
*E05B 81/20* (2014.01)
*E05B 81/36* (2014.01)
*E05B 81/66* (2014.01)

(52) U.S. Cl.

CPC .............. *E05B 81/14* (2013.01); *E05B 81/20* (2013.01); *E05B 81/36* (2013.01); *E05B 81/66* (2013.01)

(58) Field of Classification Search

CPC .......... E05B 81/14; E05B 81/18; E05B 81/20; E05B 81/34; E05B 81/36; E05B 81/64; E05B 81/66; E05B 81/68

See application file for complete search history.

(56) References Cited

U.S. PATENT DOCUMENTS

| | | | |
|---|---|---|---|
| 2,634,147 | A | 4/1953 | Robert |
| 2,806,727 | A | 9/1957 | Johnstone |
| 2,934,930 | A | 5/1960 | Garvey |
| 2,977,785 | A | 4/1961 | Beckman |
| 2,996,327 | A | 8/1961 | France et al. |
| 3,334,934 | A | 8/1967 | Bela |
| 3,359,767 | A | 12/1967 | Alfonsas et al. |
| 3,400,962 | A | 9/1968 | Martens |

(Continued)

FOREIGN PATENT DOCUMENTS

| | | | |
|---|---|---|---|
| CN | 101748944 | A | 6/2010 |
| CN | 101812947 | A | 8/2010 |

(Continued)

*Primary Examiner* — Kristina R Fulton
*Assistant Examiner* — Noah Horowitz
(74) *Attorney, Agent, or Firm* — J-TEK LAW PLLC; Jeffrey D. Tekanic; Scott T. Wakeman

(57) ABSTRACT

In a vehicle lock apparatus (1), an open/close mechanism (3) includes: a drive source (M1); an actuation lever (30) supported coaxial with a fork (10) to be swingable in first and second directions (R1, R2) independently of the fork; and a drive train (50) that swings the actuation lever: in first direction (R1) by transmitting a first driving force from the drive source to the actuation lever, and in second direction (R2) by transmitting a second driving force, opposite to the first driving force, from the drive source to the actuation lever. The actuation lever includes: a first operation portion (39) that can swing in first direction (R1) to abut on the fork and cause the fork to swing to a latched position; and a second operation portion (49) can swing in second direction (R2) to abut on a pawl (20) and displace the pawl to a nonblocking position.

23 Claims, 17 Drawing Sheets

(56) References Cited

U.S. PATENT DOCUMENTS

| | | | | |
|---|---|---|---|---|
| 3,596,482 | A | 8/1971 | Pollak | |
| 3,848,909 | A | 11/1974 | Foley | |
| 4,382,622 | A | 5/1983 | Ishikawa | |
| 4,440,006 | A | 4/1984 | Kleefeldt | |
| 4,783,102 | A | 11/1988 | Bernard | |
| 4,948,184 | A | 8/1990 | Weyerstall et al. | |
| 5,350,206 | A | 9/1994 | Akahori et al. | |
| 5,603,539 | A | 2/1997 | Gruhn et al. | |
| 5,733,046 | A | 3/1998 | Bellmore et al. | |
| 5,802,894 | A | 9/1998 | Jahrsetz et al. | |
| 6,178,845 | B1 | 1/2001 | Gutschner | |
| 6,264,253 | B1 | 7/2001 | Takaishi | |
| 6,416,088 | B1 | 7/2002 | Graute | |
| 6,419,286 | B1 | 7/2002 | Szablewski | |
| 6,601,885 | B1 | 8/2003 | Yiu | |
| 6,659,515 | B2 * | 12/2003 | Raymond | E05B 81/20 292/201 |
| 6,848,727 | B1 * | 2/2005 | Cetnar | E05B 81/20 292/216 |
| 6,971,816 | B2 | 12/2005 | Miyagawa et al. | |
| 7,261,334 | B2 * | 8/2007 | Oberheide | E05B 81/20 292/216 |
| 7,478,846 | B2 | 1/2009 | Yoshikuwa et al. | |
| 7,568,741 | B2 | 8/2009 | Odahara | |
| 7,621,571 | B2 | 11/2009 | Umino | |
| 7,762,594 | B2 | 7/2010 | Arabia, Jr. et al. | |
| 7,815,231 | B2 | 10/2010 | Suzumura et al. | |
| 7,827,836 | B2 | 11/2010 | Cetnar | |
| 8,240,723 | B2 | 8/2012 | Akahori et al. | |
| 8,376,417 | B2 | 2/2013 | Machida et al. | |
| 8,438,888 | B2 | 5/2013 | Akizuki et al. | |
| 8,678,452 | B2 | 3/2014 | Nagaoka et al. | |
| 8,726,705 | B2 | 5/2014 | Tabe et al. | |
| 8,789,861 | B2 | 7/2014 | Takayanagi et al. | |
| 8,814,228 | B2 | 8/2014 | Fujiwara et al. | |
| 8,827,328 | B2 | 9/2014 | Akizuki et al. | |
| 9,027,435 | B2 | 5/2015 | Ohba et al. | |
| 9,428,935 | B2 * | 8/2016 | Yamashita | E05B 81/14 |
| 9,631,404 | B2 | 4/2017 | Takagi et al. | |
| 9,708,837 | B2 | 7/2017 | Bendel et al. | |
| 9,903,143 | B2 * | 2/2018 | Hiramoto | E05B 81/68 |
| 10,047,548 | B2 | 8/2018 | Zeabari | |
| 10,094,149 | B2 | 10/2018 | Mittelbach | |
| 10,151,124 | B2 | 12/2018 | Faitl et al. | |
| 10,196,838 | B2 | 2/2019 | Nagaoka et al. | |
| 10,267,069 | B2 | 4/2019 | Zhang | |
| 10,273,724 | B2 | 4/2019 | Yamagata et al. | |
| 10,526,823 | B2 | 1/2020 | Nagata et al. | |
| 10,597,908 | B2 | 3/2020 | Taga | |
| 11,142,931 | B2 * | 10/2021 | Katagawa | E05B 81/16 |
| 11,613,917 | B2 * | 3/2023 | Im | E05B 81/34 70/278.7 |
| 11,692,376 | B2 * | 7/2023 | Jeong | E05B 81/06 292/201 |
| 11,697,952 | B2 * | 7/2023 | Ottino | E05F 1/105 49/139 |
| 2001/0015558 | A1 | 8/2001 | Fisher et al. | |
| 2003/0107235 | A1 | 6/2003 | Komatsu et al. | |
| 2003/0218340 | A1 | 11/2003 | Coleman et al. | |
| 2004/0178659 | A1 | 9/2004 | Komatsu et al. | |
| 2004/0227357 | A1 | 11/2004 | Ishihara et al. | |
| 2004/0251712 | A1 | 12/2004 | Obara | |
| 2005/0140149 | A1 | 6/2005 | Umino | |
| 2005/0218661 | A1 | 10/2005 | Brose et al. | |
| 2006/0006671 | A1 | 1/2006 | Noel et al. | |
| 2006/0028029 | A1 | 2/2006 | Spurr | |
| 2006/0048598 | A1 | 3/2006 | Roussel et al. | |
| 2006/0087129 | A1 | 4/2006 | Gotou et al. | |
| 2006/0157989 | A1 | 7/2006 | Graute | |
| 2006/0214467 | A1 | 9/2006 | Usuzaki et al. | |
| 2008/0078215 | A1 | 4/2008 | Odahara | |
| 2008/0203737 | A1 | 8/2008 | Tomaszewski et al. | |
| 2010/0084888 | A1 | 4/2010 | Ishitobi et al. | |
| 2010/0109350 | A1 | 5/2010 | Gschweng et al. | |
| 2010/0194120 | A1 | 8/2010 | Kaiser et al. | |
| 2010/0207401 | A1 | 8/2010 | Taga | |
| 2010/0327609 | A1 | 12/2010 | Akizuki et al. | |
| 2011/0179835 | A1 | 7/2011 | Tabe et al. | |
| 2012/0000258 | A1 | 1/2012 | Akizuki et al. | |
| 2012/0056437 | A1 | 3/2012 | Takayanagi et al. | |
| 2012/0068479 | A1 | 3/2012 | Bendel et al. | |
| 2012/0118029 | A1 | 5/2012 | Akizuki et al. | |
| 2013/0015673 | A1 | 1/2013 | Akizuki et al. | |
| 2013/0049379 | A1 | 2/2013 | Yokota et al. | |
| 2013/0328325 | A1 | 12/2013 | Uehara et al. | |
| 2014/0346786 | A1 | 11/2014 | Takagi et al. | |
| 2014/0361555 | A1 | 12/2014 | Bendel et al. | |
| 2015/0048632 | A1 | 2/2015 | Menke | |
| 2015/0191945 | A1 | 7/2015 | Yamaguchi et al. | |
| 2015/0247347 | A1 | 9/2015 | Suzumura et al. | |
| 2015/0259952 | A1 | 9/2015 | Barmscheidt | |
| 2015/0267441 | A1 | 9/2015 | Fuchs et al. | |
| 2015/0361694 | A1 | 12/2015 | Zeabari | |
| 2016/0017645 | A1 | 1/2016 | Tomaszewski et al. | |
| 2016/0115718 | A1 | 4/2016 | Lee et al. | |
| 2016/0177599 | A1 | 6/2016 | Nozawa et al. | |
| 2016/0208523 | A1 | 7/2016 | Bingle et al. | |
| 2016/0273246 | A1 | 9/2016 | Margheritti et al. | |
| 2016/0273248 | A1 | 9/2016 | Mittelbach | |
| 2016/0281395 | A1 | 9/2016 | Scholz et al. | |
| 2016/0312498 | A1 | 10/2016 | Jidaisho | |
| 2017/0122355 | A1 | 5/2017 | Estrada et al. | |
| 2017/0138096 | A1 | 5/2017 | Zhang | |
| 2017/0159334 | A1 | 6/2017 | Ishiguro | |
| 2017/0204639 | A1 | 7/2017 | Akahori et al. | |
| 2017/0234039 | A1 | 8/2017 | Taga | |
| 2018/0016820 | A1 | 1/2018 | Takagi et al. | |
| 2018/0023325 | A1 | 1/2018 | Takagi et al. | |
| 2018/0023327 | A1 | 1/2018 | Takagi et al. | |
| 2018/0073282 | A1 | 3/2018 | Takagi et al. | |
| 2018/0080262 | A1 | 3/2018 | Takagi et al. | |
| 2018/0148956 | A1 | 5/2018 | Takagi et al. | |
| 2019/0390486 | A1 | 12/2019 | Takagi et al. | |

FOREIGN PATENT DOCUMENTS

| | | | |
|---|---|---|---|
| CN | 103195310 | A | 7/2013 |
| CN | 203239056 | U | 10/2013 |
| CN | 203294205 | U | 11/2013 |
| DE | 102015223514 | A1 | 6/2016 |
| EP | 0894923 | A1 | 2/1999 |
| GB | 2396656 | A | 6/2004 |
| GB | 2477612 | A | 8/2011 |
| JP | 2002129806 | A | 5/2002 |
| JP | 2012180702 | A | 9/2012 |
| JP | 2013036242 | A | 2/2013 |
| JP | 2013096144 | A | 5/2013 |
| JP | 2013117115 | A | 6/2013 |
| JP | 2014015717 | A | 1/2014 |
| JP | 2014043769 | A | 3/2014 |
| JP | 5509377 | B1 | 6/2014 |
| JP | 2015034423 | A | 2/2015 |
| JP | 2015096683 | A | 5/2015 |
| JP | 2015190306 | A | 11/2015 |
| JP | 2015209641 | A | 11/2015 |
| JP | 2016098589 | A | 5/2016 |
| JP | 2018012940 | A | 1/2018 |
| JP | 2018031256 | A | 3/2018 |
| JP | 6350182 | B2 | 7/2018 |
| JP | 2018141361 | A | 9/2018 |

* cited by examiner

LOCK APPARATUS FOR VEHICLE OPEN/CLOSE BODY

CROSS-REFERENCE

This application claims the priority benefit of Japanese Patent Application No. 2022-091838 filed on Jun. 6, 2022, the entire contents of which are incorporated by reference as if fully set forth herein.

TECHNICAL FIELD

The present invention relates to a lock apparatus for a vehicle open/close body, such as, e.g., a tailgate, a so-called barn door, a side door, trunk lid, etc. of a vehicle.

BACKGROUND ART

Japanese Patent No. 6350182 B2 discloses an example of a lock apparatus for a vehicle open/close body. This known lock apparatus comprises a base plate, a latch, a pawl, and a closer apparatus.

The base plate is provided on a back door, which is provided on a vehicle body in an openable and closable manner. The base plate has an entry opening through which a striker, which is fixed to the vehicle body, enters.

The latch is provided on the base plate. The latch swings (pivots) between a latched position, at which the striker is latchable at the deep end of the entry opening, a half-latched position, at which the striker is latchable midway in the entry opening, and an unlatched position, at which the striker is not latched inside the entry opening.

The pawl is provided on the base plate. The pawl swings (pivots) between a blocking position, at which the latch is blocked from swinging to the unlatched position, and a non-blocking position, at which the latch is allowed to swing to the unlatched position.

The closer apparatus comprises a motor, a latch lever, a first drive train, and a second drive train.

A motor shaft of the motor rotates forwardly to thereby generate a first driving force in a first rotational direction or reversely to thereby generate a second driving force in a second rotational direction. The latch lever is supported on the base plate coaxial with the latch. The latch lever is swingable (pivotable) in a first direction and in a second direction, which is the reverse of the first direction, independently of the latch. The latch lever comprises a sector gear.

The first drive train comprises: a first speed-reducing gear; a pinion gear, which rotates integrally with the first speed-reducing gear; a second speed-reducing gear, which meshes with the pinion gear; and a first drive gear, which rotates integrally with the second speed-reducing gear. The first drive gear is meshable with the sector gear.

The second drive train branches from the second speed-reducing gear of the first drive train. The second drive train comprises: a pressing pin, which rotates integrally with the second speed-reducing gear; an open lever (or opening lever), which is supported on the base plate in a swingable manner coaxial with the second speed-reducing gear; and a lift lever (or lifting lever), which is coupled to the pawl via support shafts.

The first drive train transmits the first driving force from the motor to the latch lever, thereby causing the latch lever to swing in the first direction (first pivot direction); i.e. a rotational driving force output by the motor that causes the latch lever to pivot in the first direction is transmitted to the latch lever. Then, a lever portion of the latch lever abuts on and pushes an engaging portion of the latch, and therefore the latch lever causes the latch to swing to the latched position. This causes the pawl to swing to the blocking position. Consequently, the back door is retained in a closed state.

On the other hand, the first drive train transmits the second driving force from the motor to the second drive train; i.e. a rotational driving force output by the motor in an opposite rotational direction is transmitted to the second drive train. Then, the pressing pin pushes the open lever to swing, and thereby the open lever pushes the lift lever to swing. Thereby, the second drive train causes the pawl to swing to the non-blocking position. Consequently, the retained state of the back door is released, and the back door thereby becomes openable.

However, with regard to the above-described known lock apparatus, because the closer apparatus is configured such that it comprises the second drive train, it is difficult to reduce the part count and the number of assembly steps. Consequently, it is difficult to lower the manufacturing cost.

SUMMARY OF THE INVENTION

Accordingly, it is one non-limiting object of the present teachings to disclose techniques for improving a lock apparatus for use with a vehicle open/close body that e.g., leads to lowering the manufacturing cost.

A lock apparatus for a vehicle open/close body of one aspect of the present teachings may comprise:

- a base member provided on one of a vehicle body and an open/close body, which is provided on the vehicle body in an openable and closable manner, and that has an entry opening configured to receive a striker, which is fixed to the other of the vehicle body and the open/close body;
- a fork provided on the base member and configured to be swingable in a swing (pivotal) range that includes: a latched position, which is at the deep end of the entry opening and at which the striker is latchable; a half-latched position, which is midway in (along) the entry opening and at which the striker is latchable; and an unlatched position, which is within the entry opening and at which the striker will not latch;
- a pawl provided on the base member and displaceable to: a blocking position, at which the fork is blocked from swinging to the unlatched position; and a non-blocking position, at which the fork is allowed to swing (pivot) to the unlatched position; and
- an open/close mechanism configured to: displace the pawl to the non-blocking position if (when) the open/close mechanism acts on the pawl, and cause the fork to swing (pivot) to the latched position if (when) the open/close mechanism acts on the fork;

wherein:

the open/close mechanism comprises:

- a drive source configured to generate a first driving force by rotating in a forward direction and a second driving force by rotating in a reverse direction;
- an actuation lever supported on the base member coaxial with the fork and swingable in a first direction and in a second direction, which is the opposite of the first direction, independently of the fork; and
- a drive train configured to cause the actuation lever to swing (pivot): in the first direction in response to transmitting the first driving force from the drive source to the actuation lever, and in the second direction in response to transmitting the second driving force from the drive source to the actuation lever; and the actuation lever comprises:

a first operation portion that, when swung (pivoted) in the first direction, abuts on the fork and causes the fork to swing (pivot) to the latched position; and a second operation portion that, when swung (pivoted) in the second direction, abuts on the pawl and displaces the pawl to the non-blocking position.

In the lock apparatus of the above-described aspect of the present teachings, the drive train of the open/close mechanism transmits the first driving force from the drive source (i.e. a shaft of the drive source, which rotates in a first rotational direction) to the actuation lever, thereby causing the actuation lever to swing (pivot) in the first direction. Then, the first operation portion of the actuation lever abuts on the fork, thereby causing the fork to swing (pivot) to the latched position. This displaces the pawl to the blocking position. Consequently, the open/close body is retained in the closed state.

On the other hand, the drive train transmits the second driving force from the drive source (i.e. the shaft of the drive source, which rotates in a second rotational direction opposite to the first rotational direction) to the actuation lever, thereby causing the actuation lever to swing (pivot) in the second direction. Then, the second operation portion of the actuation lever abuts on the pawl, thereby displacing the pawl to the non-blocking position. Consequently, the retained state of the open/close body (such as a tailgate) is released, and the open/close body becomes openable.

In the lock apparatus according to this aspect of the present teachings, the open/close mechanism does not comprise elements equivalent to a second drive train, i.e., a pressing pin, an open lever, and a lift lever, which are required by the above-described known lock apparatus. Consequently, with the lock apparatus of the present aspect of the present teachings, it is possible to reduce the part count and the number of assembly steps.

Accordingly, with the lock apparatus of the present aspect of the present teachings, it is possible to lower the manufacturing cost.

Additionally, in the lock apparatus, because the open/close mechanism does not comprise elements equivalent to the second drive train that are required by the above-described known lock apparatus, it is possible to design the layout of the drive source and the drive train more freely. Consequently, it is possible to downsize the lock apparatus.

In another aspect of the present teachings, the lock apparatus preferably further comprises: a first support shaft, which projects from the base member and supports the fork and the actuation lever in a swingable (pivotable) manner; and a second support shaft, which projects from the base member and supports the pawl in a swingable (pivotable) manner. The actuation lever preferably comprises a sector gear that meshes with an output gear of the drive train, to which the first driving force or the second driving force is last transmitted. Furthermore, when at least the actuation lever swings (pivots) in the second direction, the sector gear is preferably configured to become interposed between the first support shaft and the second support shaft.

In this aspect of the present teachings, by positioning the second operation portion near the sector gear, the second operation portion causes the pawl to be displaced to the non-blocking position more smoothly when the actuation lever swings (pivots) in the second direction.

In a different aspect of the present teachings, a circumvention portion, which is recessed in the first direction so as to circumvent the striker when the striker is entering the entry opening, is preferably formed in (on) the actuation lever between the sector gear and the first support shaft.

In this aspect of the present teachings, if (when) the actuation lever is disposed such that it overlaps the striker, which enters the entry opening, in the direction in which the first support shaft extends, the circumvention portion prevents the actuation lever from interfering with the striker. Consequently, it is possible to downsize the lock apparatus in the direction in which the first support shaft extends.

In a different aspect of the present teachings, the lock apparatus preferably further comprises: the first support shaft, which projects from the base member and supports the fork and the actuation lever in a swingable (pivotable) manner; and a backplate, which opposes the base member and to which an end portion of the first support shaft on the side opposite the base member is fixed. Furthermore, the actuation lever, the fork and the pawl are preferably located (disposed) between the base member and the backplate.

In this aspect of the present teachings, it is possible to downsize the lock apparatus in the direction in which the first support shaft extends, compared with a configuration in which the actuation lever is not located between the base member and the backplate. Additionally, in this aspect of the present teachings, the actuation lever is firmly supported by the first support shaft, whose ends are fixed to the base member and the backplate, respectively. Consequently, the actuation lever is unlikely to change its posture even when receiving a large force, thereby causing the first operation portion to act on the fork stably and causing the second operation portion to act on the pawl stably.

In a different aspect of the present teachings, the lock apparatus preferably further comprises a first microswitch and a second microswitch. The first microswitch and the second microswitch each preferably comprise: a movable projection, which is capable of being (configured to be) pushed in; a first circuit, which switches between connection and disconnection at a first stroke amount, by which the movable projection is pressed in; and a second circuit, which switches between connection and disconnection at a second stroke amount, by which the movable projection is pressed in further from (deeper than) the first stroke amount. The first microswitch is preferably configured to detect when the fork is at the latched position, at the half-latched position, and at the unlatched position. The actuation lever is preferably swingable (pivotable) in a swinging range that includes: an origin position; a first actuation-end position, which is a first limit position when swinging from the origin position in the first direction; a second actuation-end position, which is a second limit position when swinging from the origin position in the second direction; a first intermediate position, which is between the origin position and the first actuation-end position; and a second intermediate position, which is between the origin position and the second actuation-end position. Furthermore, the first actuation-end position and the second actuation-end position may be collectively referred to as actuation-end positions and the first intermediate position and the second intermediate position may be collectively referred to as intermediate positions. In this case, the second microswitch is preferably configured to detect when the actuation lever is one of at the origin position, at the actuation-end positions, and at the intermediate positions.

In this aspect of the present teachings, the control part (e.g., an electronic control unit or "ECU") of the vehicle on which the lock apparatus is mounted, is capable of precisely determining the state (position) of the fork and the state (position) of the actuation lever based on information transmitted from the first microswitch and the second microswitch. In this case, it is possible to reduce the part count and the number of assembly steps, compared with a configuration in which two one-circuit microswitches are respectively provided for the fork and the actuation lever. Consequently, with the lock apparatus of the present aspect of the present teachings, it is possible to further lower the manufacturing cost.

In a different aspect of the present teachings, the lock apparatus preferably further comprises: a first detecting lever, which is provided in a swingable (pivotable) manner between the movable projection of the first microswitch and the fork and is configured to transmit swinging (pivoting) movement of the fork to the movable projection of the first microswitch; and a second detecting lever, which is provided in a swingable (pivotable) manner between the movable projection of the second microswitch and the actuation lever and is configured to transmit swinging (pivoting) movement of the actuation lever to the movable projection of the second microswitch.

In this case, it is possible to design the layout of the first microswitch and the second microswitch more freely. Consequently, it is possible to downsize the lock apparatus.

Other aspects and advantages of the present invention should be clear from the working example explained in the following description and shown in the attached drawings, from the illustrations in these drawings, and from the concept or gist of the present invention disclosed overall in the specification and these drawings.

DETAILED DESCRIPTION OF EMBODIMENTS

A working example according to the present teachings is explained below, with reference to the drawings.

Working Example

Figure 1:
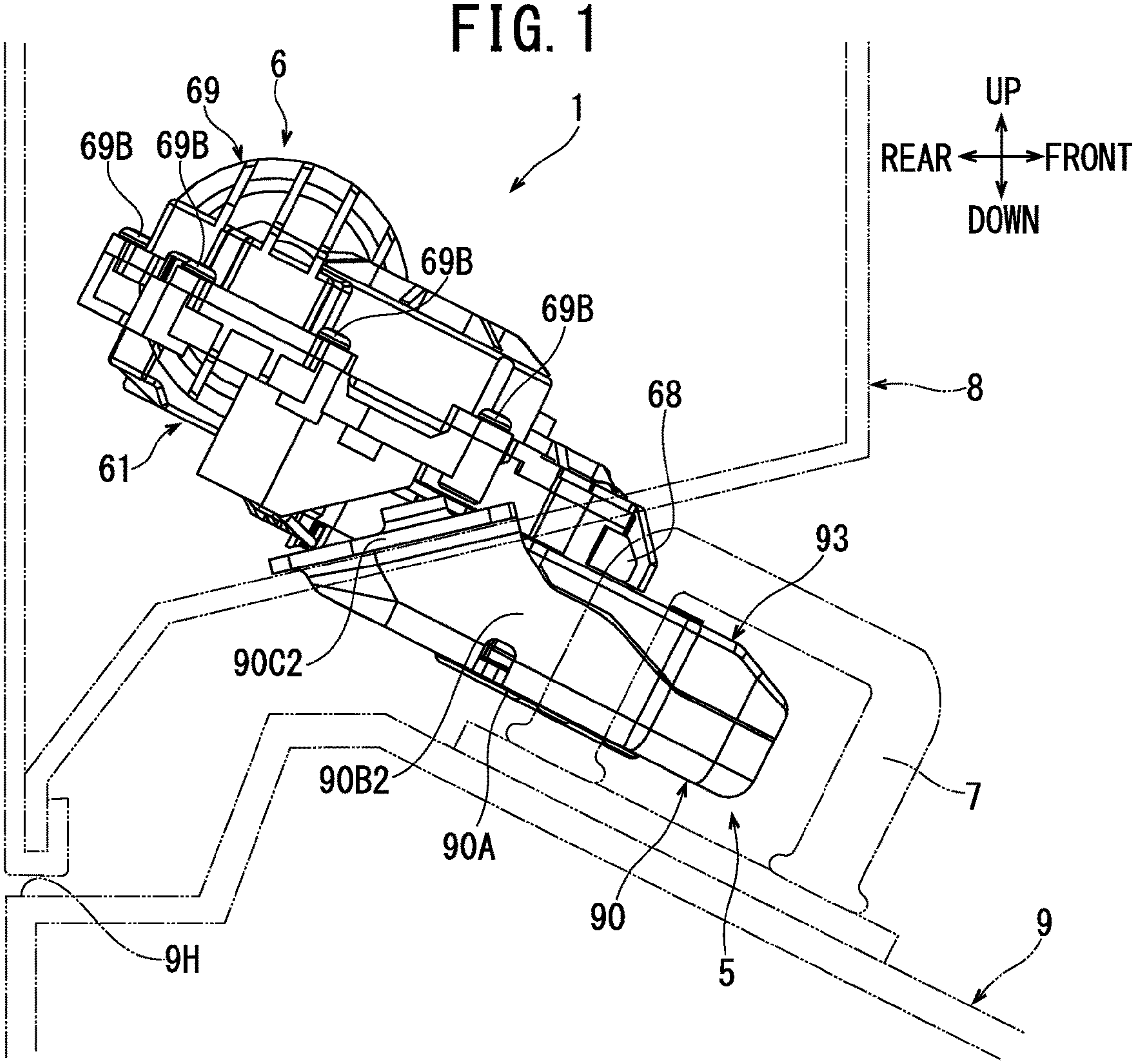
FIG. 1 is a side view of a lock apparatus for use with a vehicle open/close body according to a working example of the present teachings.

As shown in FIG. 1, lock apparatus 1 of the working example is one example of an embodiment of a lock apparatus for use with a vehicle open/close body according to the present teachings. The lock apparatus 1 is used in (on) a tailgate 8, which is provided in an openable and closable manner on a vehicle body 9 of a vehicle, which is a passenger vehicle or the like. The tailgate 8 is one example of a "vehicle open/close body" according to the present teachings. Other representative examples of a vehicle open/close body according to the present teachings include, but are not limited to, e.g., rear doors, so-called "barn doors", etc. Further examples of vehicle open/close bodies are mentioned below.

A front-rear direction and an up-down direction of the vehicle are as shown in FIG. 1. A left-right direction of the vehicle is orthogonal to the front-rear direction and the up-down direction. A right (rightward) direction of the vehicle is toward the near side of the paper plane of FIG. 1. A left (leftward) direction of the vehicle is toward the far side of the paper plane of FIG. 1. Furthermore, each direction shown in FIG. 3 and in subsequent figures corresponds to the respective directions shown in FIG. 1.

As shown in FIG. 1, the tailgate 8 closes a rear opening 9H of the vehicle body 9. Although omitted in the drawings, the upper end of the tailgate 8 is supported in a swingable (hinged) manner on an upper-end edge of the rear opening 9H. When the lower end of the tailgate 8 swings rearward and upward relative to the vehicle body 9, the tailgate 8 opens the rear opening 9H.

The lock apparatus 1 is provided at the lower end of the tailgate 8 and assumes the attitude shown in FIG. 1 when the tailgate 8 closes (has closed) the rear opening 9H. A striker 7 is fixed to a lower-end edge of the rear opening 9H of the vehicle body 9.

It is noted that, in the explanation below regarding the configuration of the lock apparatus 1, the front-rear direction, the up-down direction, and the left-right direction are set with reference to the attitude of the lock apparatus 1 shown in FIG. 1.

Figure 2:
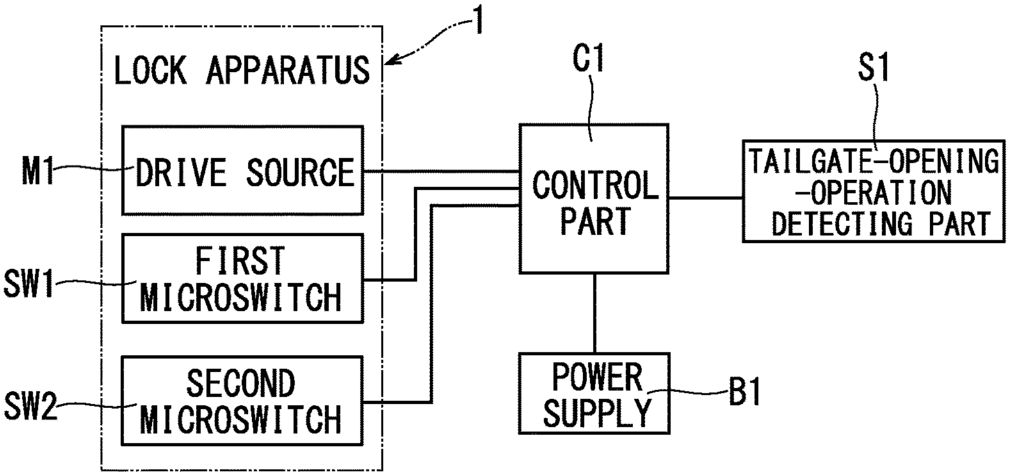
FIG. 2 is a block diagram of the lock apparatus according to the working example.

As shown in FIG. 2, the lock apparatus 1 is electrically connected to a control part (electronic control unit) C1, which is provided in the vehicle body 9. A power supply B1, a tailgate-opening-operation detecting part S1, etc. are electrically connected to the control part C1. To make the tailgate 8 releasable, the tailgate-opening-operation detecting part S1 is configured to detect (i) an opening operation performed by a user (e.g., by pulling a door handle (doorknob)), (ii) an opening operation performed by using a remote-control switch (e.g., pressing a button on a key fob), or (iii) the like, and transmits a detection signal to the control part C1.

Figure 3:
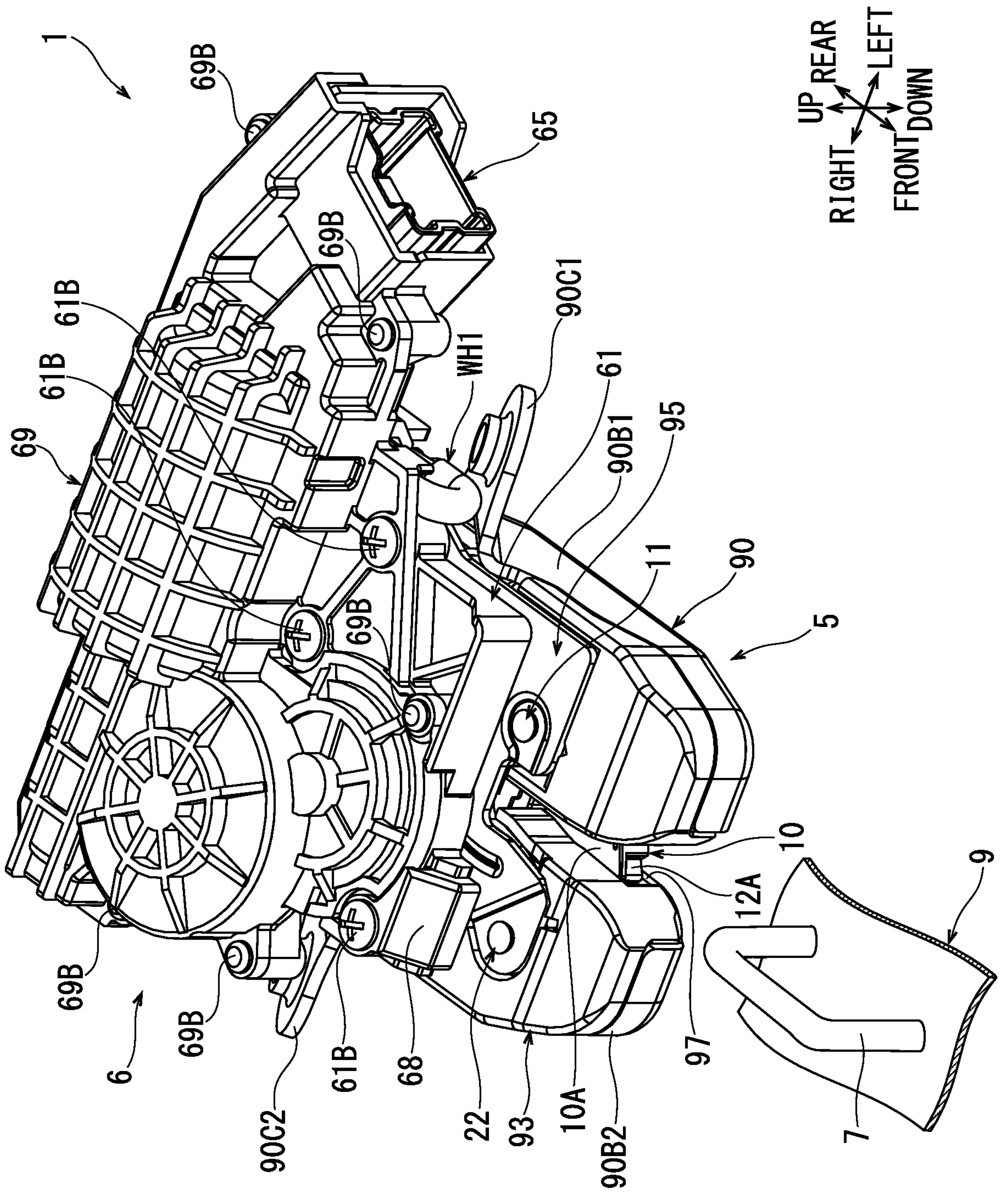
FIG. 3 is an oblique view of the lock apparatus according to the working example.

As shown in FIG. 1 and FIG. 3, the lock apparatus 1 comprises a lock-apparatus main body 5 and an actuator 6.

The lock-apparatus main body 5 comprises: a base member 90, which is shown in FIG. 1 and FIG. 3 to FIG. 7; a backplate 95, which is shown in FIG. 3 to FIG. 5 and FIG. 7; a guide base 93, which is shown in FIG. 1, FIG. 3 to FIG. 6, and FIG. 8; and a first support shaft 11 and a second support shaft 22, which are shown in FIG. 3 to FIG. 7.

Additionally, the lock-apparatus main body 5 comprises: a fork 10, which is shown in FIG. 3 to FIG. 9; a pawl 20, which is shown in FIG. 4 to FIG. 9; and an actuation lever 30, which is shown in FIG. 5 to FIG. 9.

Furthermore, the lock-apparatus main body 5 comprises: a first microswitch SW1 and a second microswitch SW2, which are shown in FIG. 2, FIG. 5, FIG. 6, and FIGS. 10A, 10B and 10C; a first detecting lever 71, which is shown in FIG. 5 to FIG. 9; and a second detecting lever 72, which is shown in FIG. 5 to FIG. 7 and FIG. 9.

Figure 4:
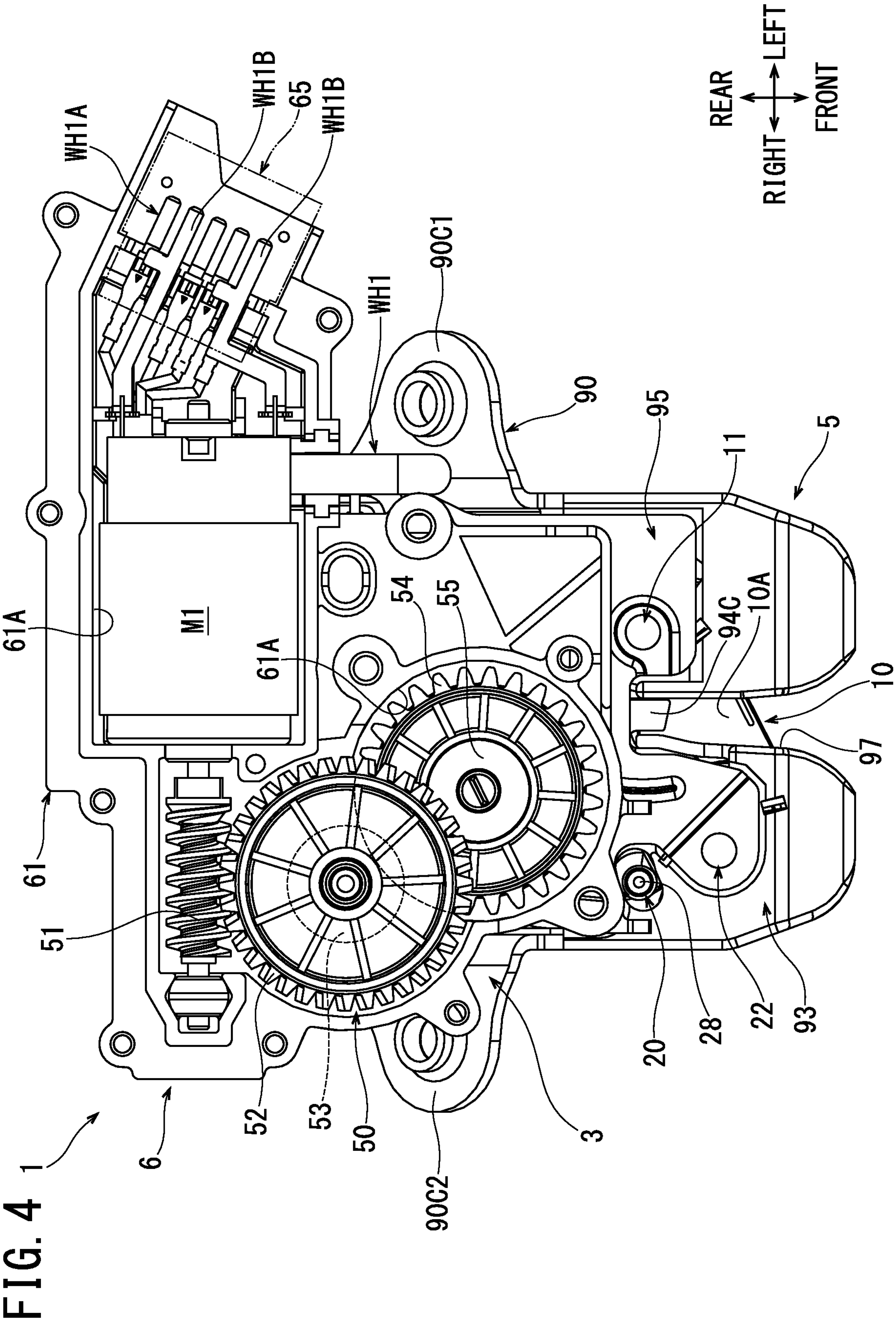
FIG. 4 is a top view that shows an actuator with an actuator cover removed, and a lock-apparatus main body.
Figure 5:
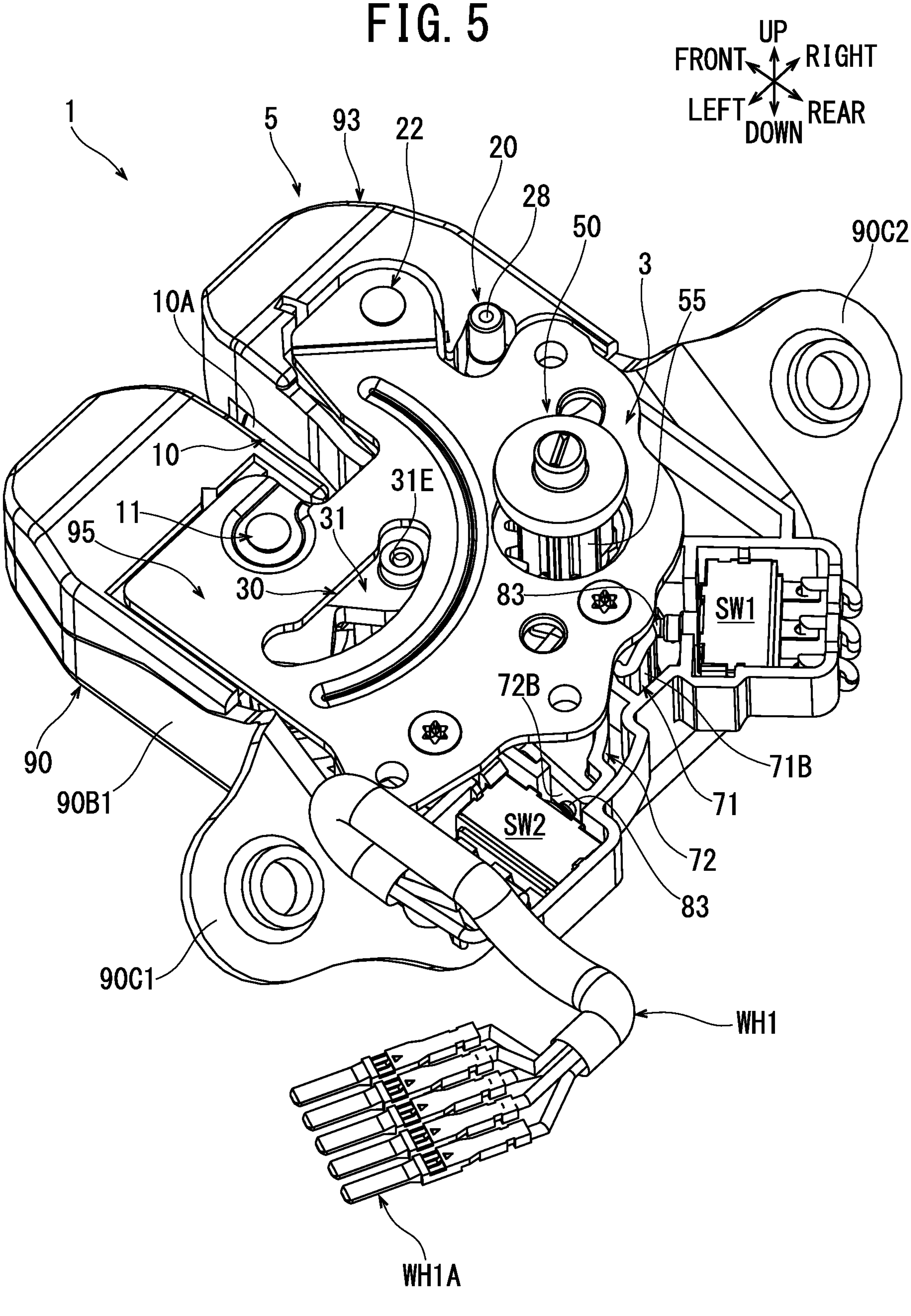
FIG. 5 is an oblique view that shows an output gear of the actuator and the lock-apparatus main body.
Figure 6:
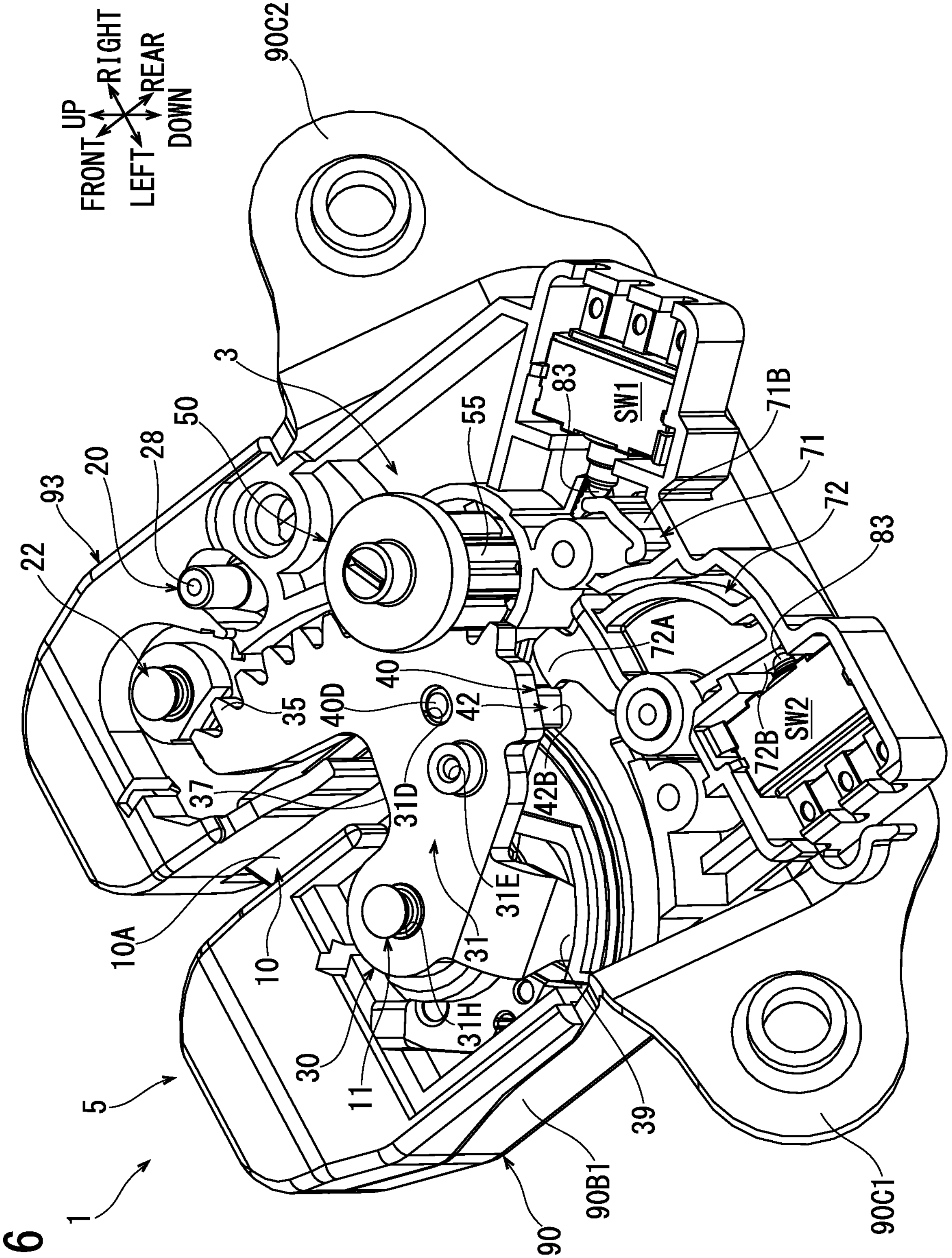
FIG. 6 is an oblique view that shows the output gear of the actuator and the lock-apparatus main body with a backplate removed.

The actuator 6 comprises: an actuator case 61, which is shown in FIG. 1, FIG. 3, and FIG. 4; an actuator cover 69, which is shown in FIG. 1 and FIG. 3; a connector 65, which is shown in FIG. 3 and FIG. 4; a drive source M1, which is shown in FIG. 2 and FIG. 4; and a drive train 50, which is shown in FIG. 4 to FIG. 6.

The lock apparatus 1 comprises an open/close mechanism 3 that includes: the actuation lever 30 of the lock-apparatus main body 5; and the drive source M1 and the drive train 50 of the actuator 6.

The specific configuration of each component is explained below.

Figure 7:
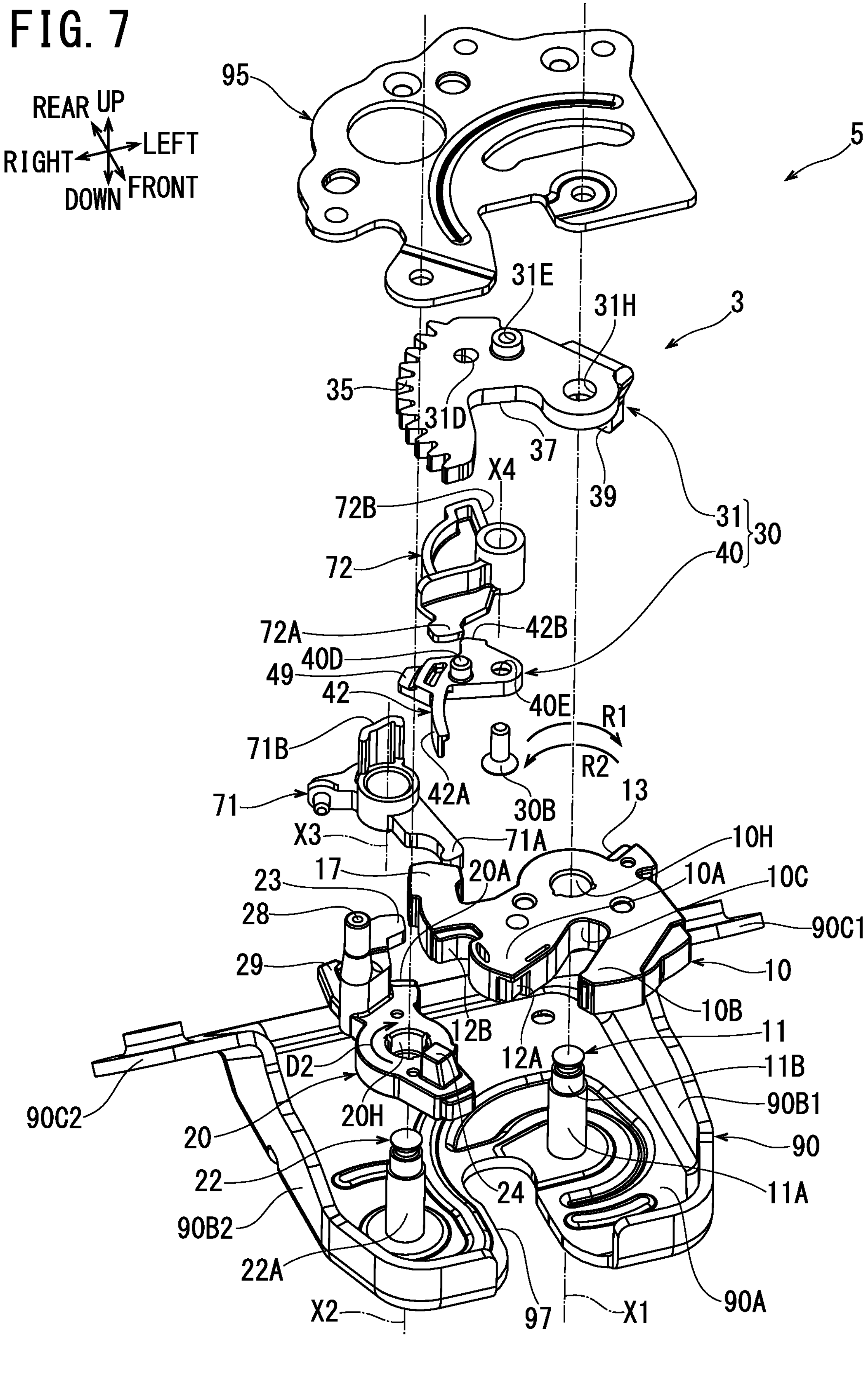
FIG. 7 is an exploded, oblique view that shows the principal components of the lock-apparatus main body.

Base Member, Backplate, Guide Base, First Support Shaft, and Second Support Shaft As shown in FIG. 7, the base member 90 and the backplate 95 are each formed by punching and bending a steel plate.

The base member 90 comprises a flat-plate part 90A, a pair of wall parts 90B1, 90B2 and a pair of mounting parts 90C1, 90C2.

The flat-plate part 90A has a substantially rectangular, flat-plate shape extending substantially horizontally in the left-right direction and extending such that it is forward facing and tilted downward. An entry opening 97, which is deeply recessed rearward from a front-end edge of the flat-plate part 90A, is formed in the flat-plate part 90A.

The left wall part 90B1 comprises: a left wall, which bends and extends upward from a left-end edge of the flat-plate part 90A and extends in the front-rear direction; and a left-side front wall, which bends and extends upward from a portion of the front-end edge of the flat-plate part 90A that is located leftward of the entry opening 97, extends in the left-right direction, and connects to the front end of the left wall.

The right wall part 90B2 comprises: a right wall, which bends and extends upward from a right-end edge of the flat-plate part 90A and extends in the front-rear direction; and a right-side front wall, which bends and extends upward from a portion of the front-end edge of the flat-plate part 90A that is located rightward of the entry opening 97, extends in the left-right direction, and connects to the front end of the right wall.

The mounting part 90C1 bends and extends leftward from a rear upper end of the wall part 90B1 and the mounting part 90C2 bends and extends rightward from a rear upper end of the wall part 90B2, such that the mounting parts 90C1 and 90C2 extend away from one another.

As shown in FIG. 1 and FIG. 3, the mounting parts 90C1 and 90C2 are used to fasten the lock apparatus 1 to the lower end of the tailgate 8. When the lock apparatus 1 moves as the tailgate 8 closes or opens, the striker 7, which is fixed to the vehicle body 9, enters or withdraws, respectively, from the entry opening 97.

As shown in FIG. 5 and FIG. 7, the backplate 95 has a substantially flat-plate shape that opposes the flat-plate part 90A of the base member 90 from above and extends parallel to the flat-plate part 90A. A notch, which is for alignment with the entry opening 97, openings, which are for avoiding interference with other components, fastening holes, and the like are formed in the backplate 95.

Figure 8:
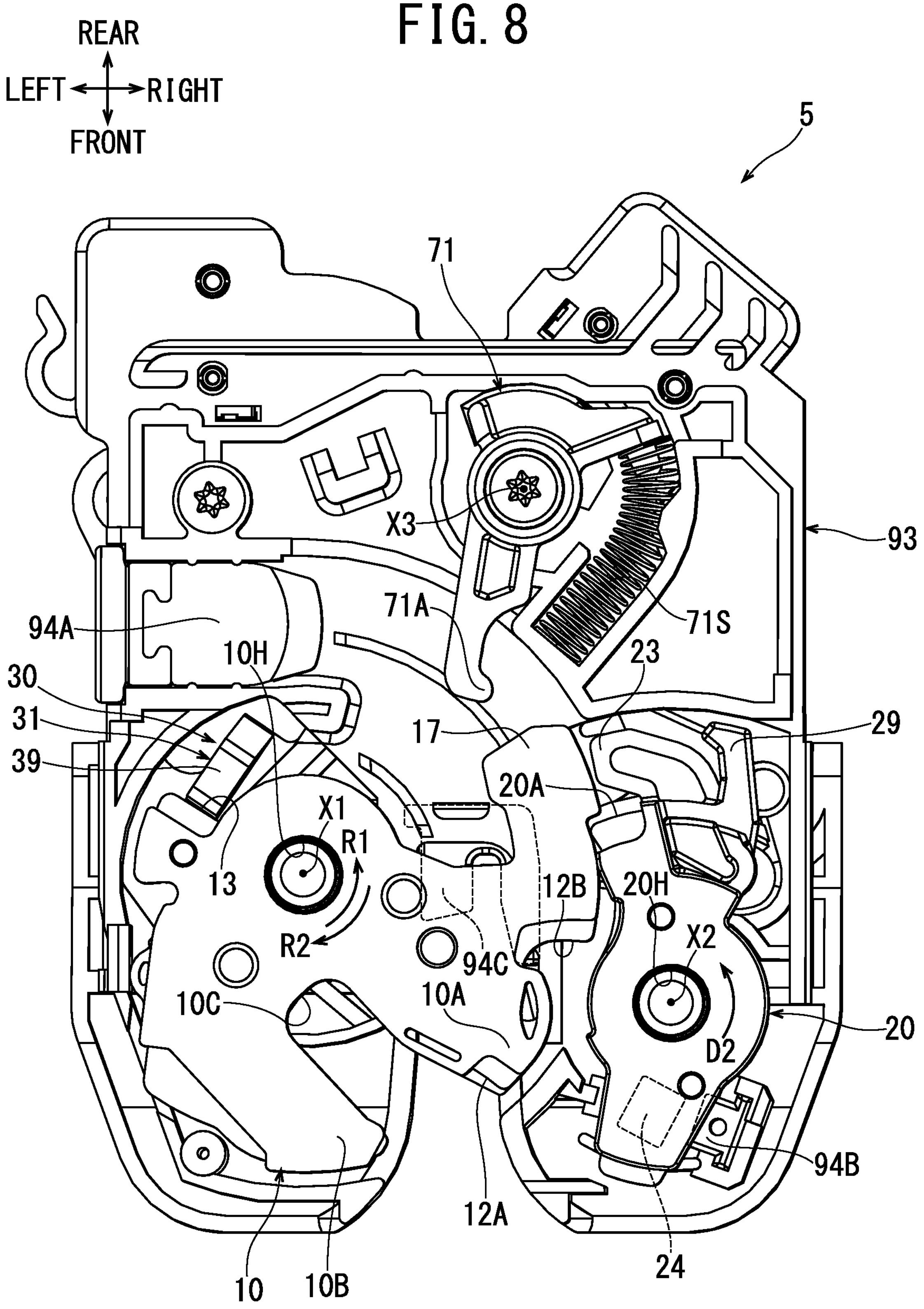
FIG. 8 is a bottom view that shows the lock-apparatus main body with a base member removed.

As shown in FIG. 6 and FIG. 8, the guide base 93 is a resin-molded product manufactured by injection molding, or the like, of a thermoplastic resin. A notch that aligns with the entry opening 97, openings for avoiding interference with other components, recessed parts for retaining other components, fastening holes, and the like are formed in the guide base 93. As shown in FIG. 5, the guide base 93 is sandwiched between the flat-plate part 90A of the base member 90 and the backplate 95.

As shown in FIG. 4 and FIG. 8, a damper 94C is retained on the guide base 93. When the striker 7 enters the deep end of the entry opening 97, the striker 7 is capable of abutting on the damper 94C.

As shown in FIG. 7, the first support shaft 11 is a multi-stepped circular column made of steel and is centered on first axial center X1, which is orthogonal to (a plane defined by) the flat-plate part 90A of the base member 90.

The first support shaft 11 is provided projecting upward from the flat-plate part 90A by swaging a lower-end portion of the first support shaft 11 to a portion of the flat-plate part 90A of the base member 90, which is spaced apart leftward from the deep end of the entry opening 97. An upper-end portion of the first support shaft 11 is an end portion of the first support shaft 11 on the side opposite to the base member 90.

The first support shaft 11 comprises a fork-support part 11A and an actuation-lever support part 11B. The fork-support part 11A is located on a lower-end-portion side of the first support shaft 11. The actuation-lever support part 11B is located on an upper-end-portion side of the first support shaft 11 and has a diameter smaller than the diameter of the fork-support part 11A.

As shown in FIG. 7, the second support shaft 22 is a multi-stepped circular column made of steel and is centered on second axial center X2, which is orthogonal to (the plane defined by) the flat-plate part 90A of the base member 90.

The second support shaft 22 is provided projecting upward from the flat-plate part 90A by swaging a lower-end portion of the second support shaft 22 to a portion of the flat-plate part 90A of the base member 90, which is spaced apart rightward from a region located midway in the entry opening 97.

The second support shaft 22 comprises a pawl-support part 22A. The pawl-support part 22A is located on a lower-end-portion side of the second support shaft 22.

As shown in FIG. 5, the base member 90, the backplate 95, and the guide base 93 are integrated by swaging the upper-end portion of the first support shaft 11 and an upper-end portion of the second support shaft 22 to the backplate 95.

Fork

As shown in FIG. 7, the fork 10 is formed including: a thick steel plate, which has notches, recesses, protrusions and the like on its outer perimeter; and a shaft hole 10H, which passes through the steel plate in the thickness direction of the steel plate. Furthermore, the steel plate is covered by a resin in large part (e.g., at least a large part thereof).

The fork 10 is provided on the base member 90 while the fork 10 is adjacent to the flat-plate part 90A of the base member 90 from above. The fork 10 is supported on the first support shaft 11 so as to be swingable (pivotable) about first axial center X1 owing to the fork-support part 11A of the first support shaft 11 being inserted through the shaft hole 10H.

The fork-support part 11A of the first support shaft 11 is also inserted through a coil portion of a torsion coil spring, which is not shown. As shown in FIG. 8, the counterclockwise direction about first axial center X1 is referred to as first direction (first rotational direction) R1. The torsion coil spring, which is not shown, urges (biases) the fork such that the fork 10 is urged (swung) about first axial center X1 in second direction (second rotational direction) R2, which is the reverse or opposite of first direction R1.

Figure 9:
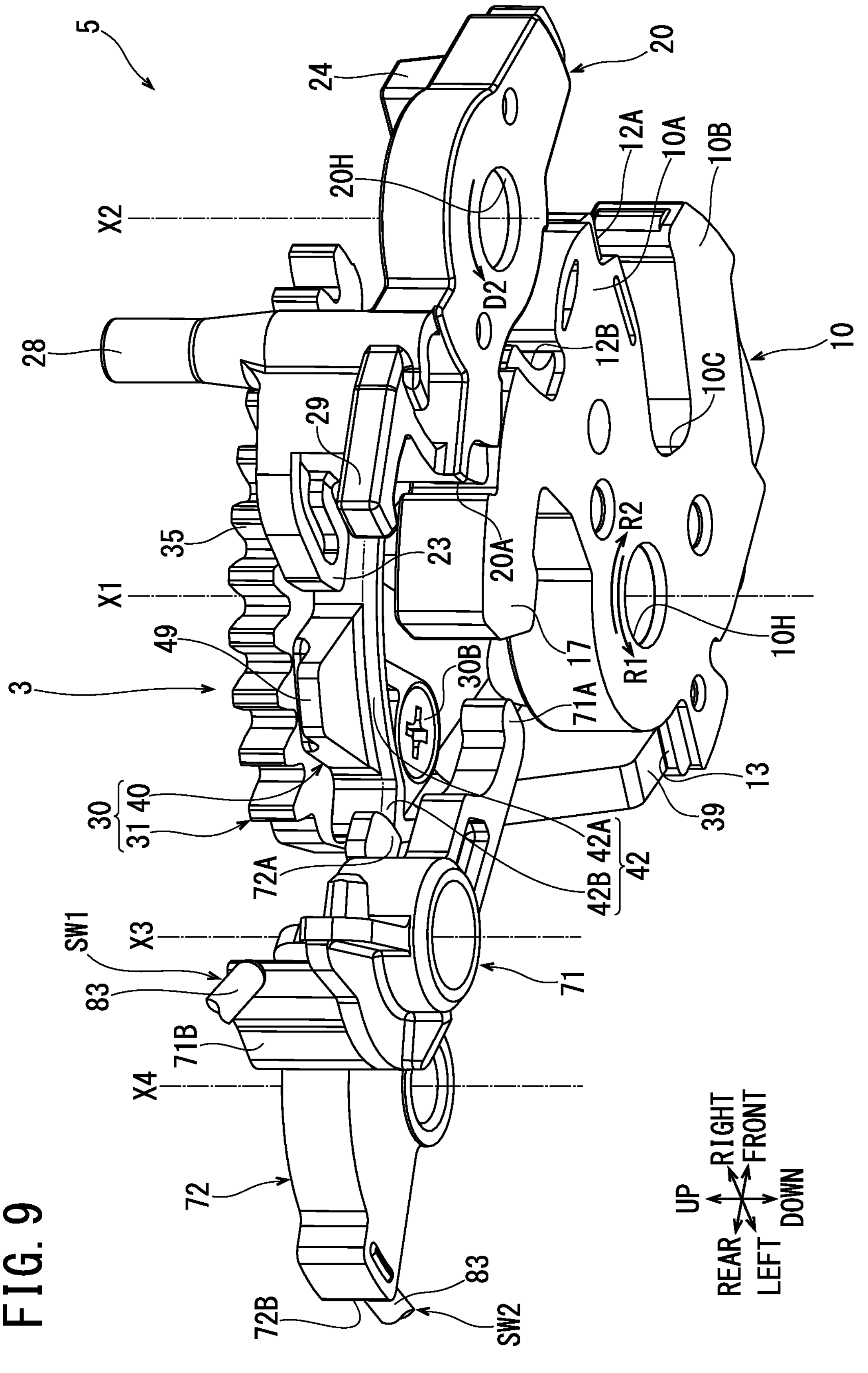
FIG. 9 is an oblique view that shows the relative relationships among the principal components of the lock-apparatus main body.

As shown in FIG. 7 to FIG. 9, a region located on the entry opening 97 side of the fork 10 branches (forks) into a rear-side protruding part 10A and a front-side protruding part 10B. A recessed part 10C is formed (defined) between the rear-side protruding part 10A and the front-side protruding part 10B and is configured to receive the striker 7 when it enters the entry opening 97.

A latch surface 12A, a half-latch surface 12B, and a force-receiving surface 13 are formed on the outer perimeter of the fork 10.

The latch surface 12A is located at the tip of the rear-side protruding part 10A and is oriented downstream in second direction R2. The latch surface 12A is capable of abutting on a stopper surface 20A of the pawl 20, which is described below.

The half-latch surface 12B is a surface of a portion that protrudes in a step shape in a radially outward direction of first axial center X1. The half-latch surface 12B is spaced apart from the latch surface 12A in first direction R1. The half-latch surface 12B is oriented downstream in second direction R2. The half-latch surface 12B is also capable of abutting on the stopper surface 20A.

The force-receiving surface 13 is a surface of a portion that protrudes in a step shape radially outward of first axial center X1. The force-receiving surface 13 is located on the opposite side of the latch surface 12A across first axial center X1. The force-receiving surface 13 is oriented upstream in first direction R1. The force-receiving surface 13 is capable of abutting on a first operation portion 39 of the actuation lever 30, which is described below.

The latch surface 12A, the half-latch surface 12B, and the force-receiving surface 13 are steel-plate portions of the fork 10 that are not covered by the resin.

As shown in FIG. 11 to FIG. 18, by swinging (pivoting) about first axial center X1 in first direction R1 and in second direction R2, the fork 10 swing in a swinging (pivotal) range that includes a latched position, a half-latched position, and an unlatched position.

Figure 15:
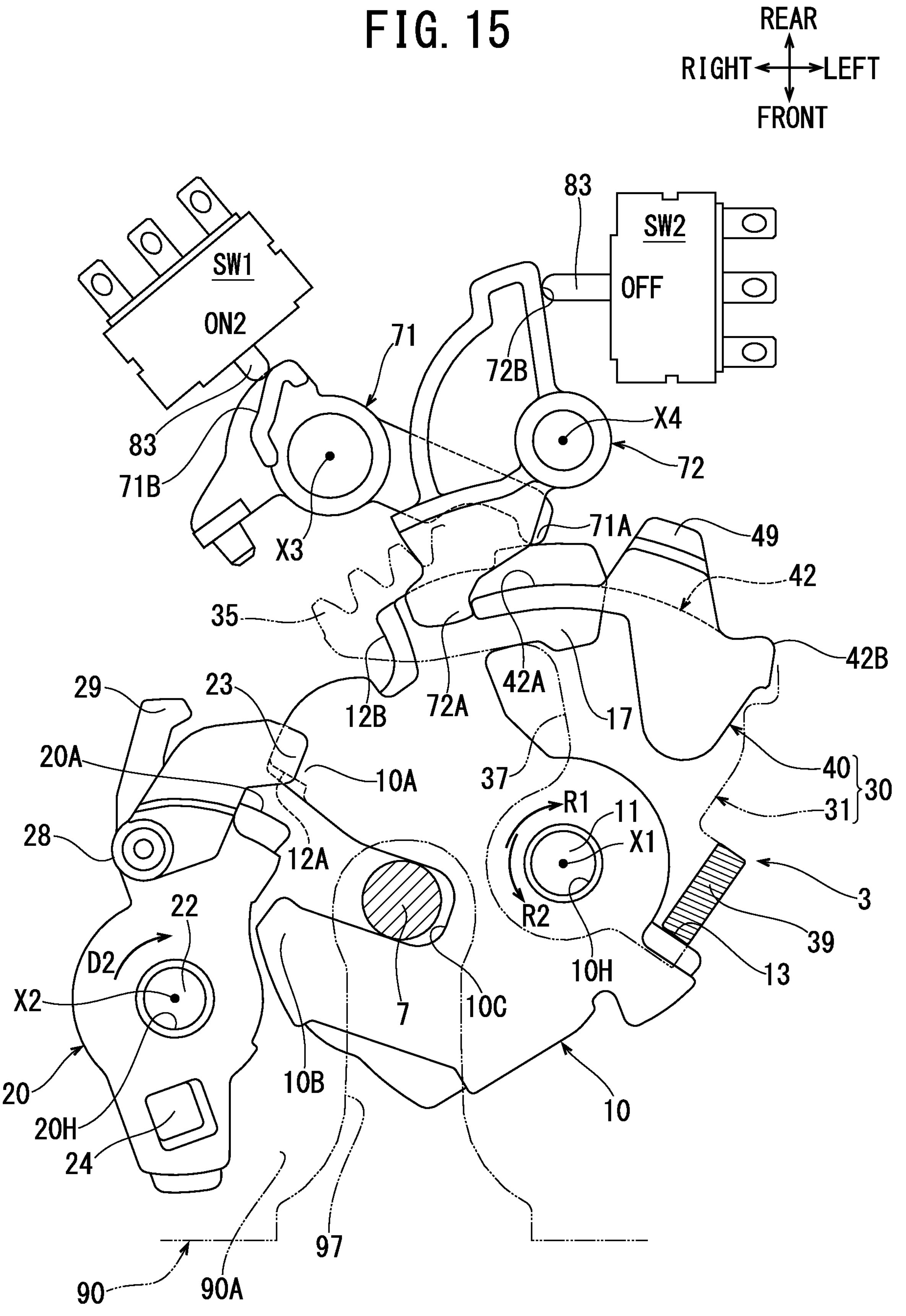
FIG. 15 is a schematic drawing that explains an aspect of the operation of the open/close mechanism.
Figure 16:
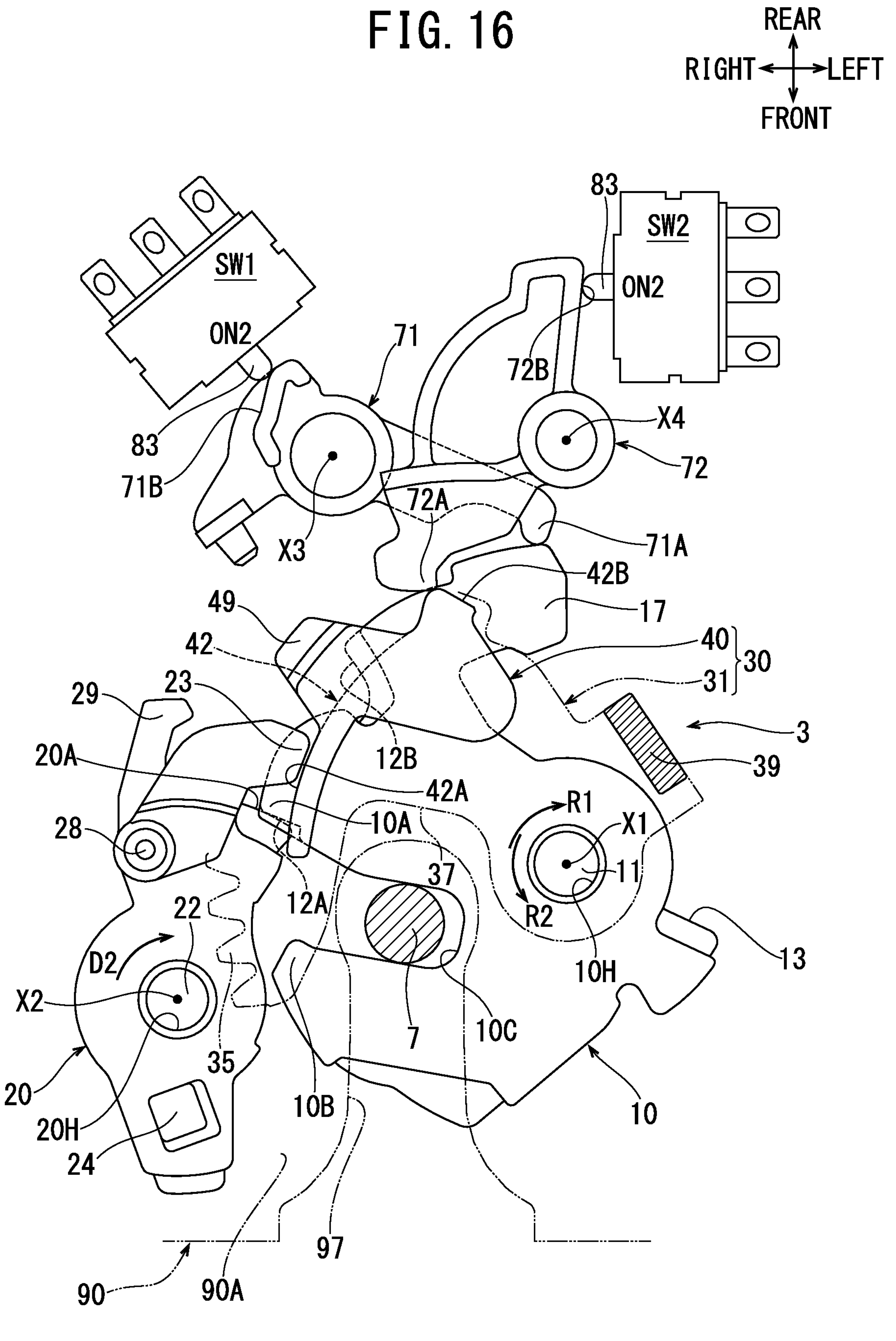
FIG. 16 is a schematic drawing that explains an aspect of the operation of the open/close mechanism.
Figure 17:
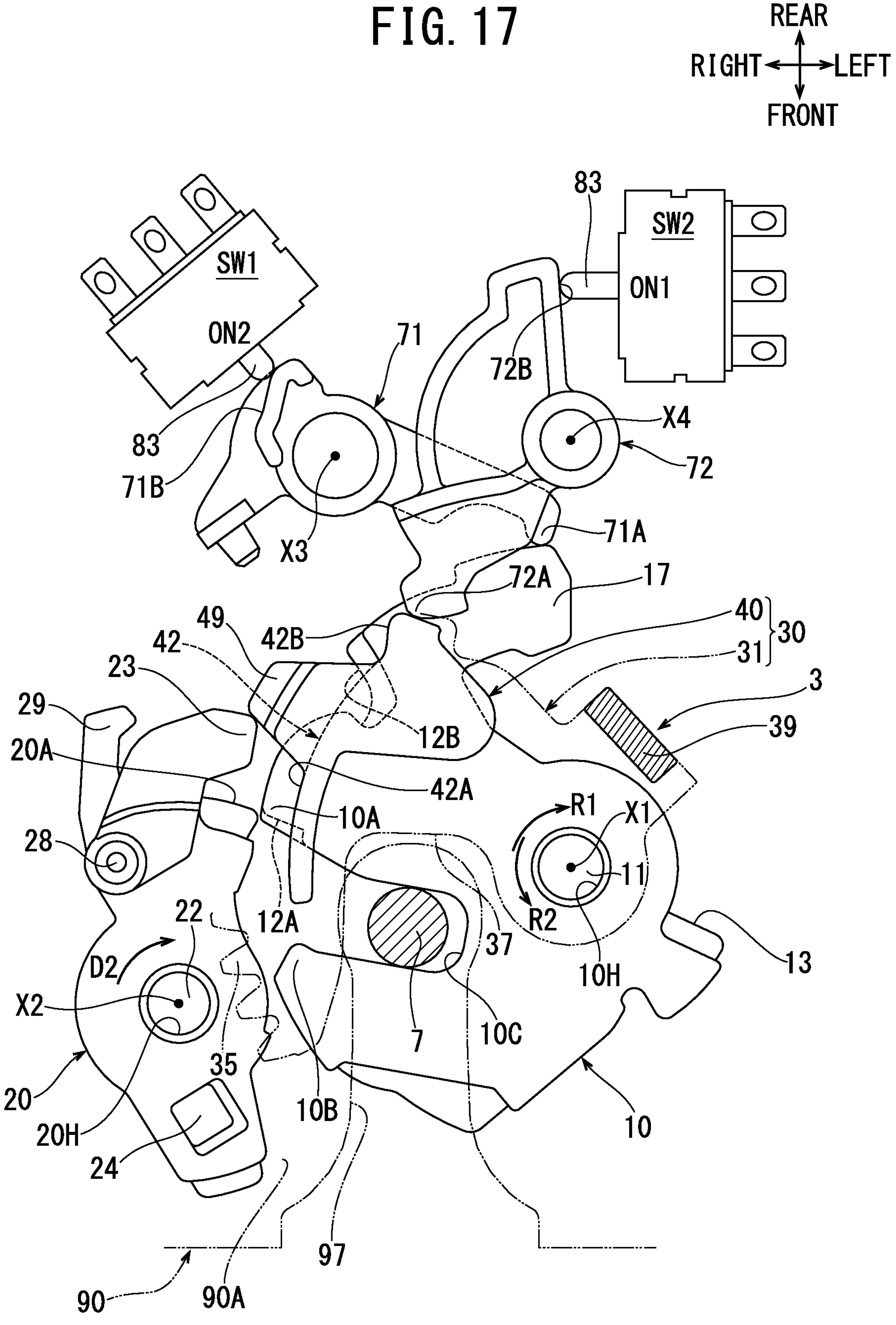
FIG. 17 is a schematic drawing that explains an aspect of the operation of the open/close mechanism.

As shown in FIG. 15 to FIG. 17, the latched position of the fork 10 is a position, which is at the deep end of the entry opening 97 and at which the striker 7 is latchable.

Figure 13:
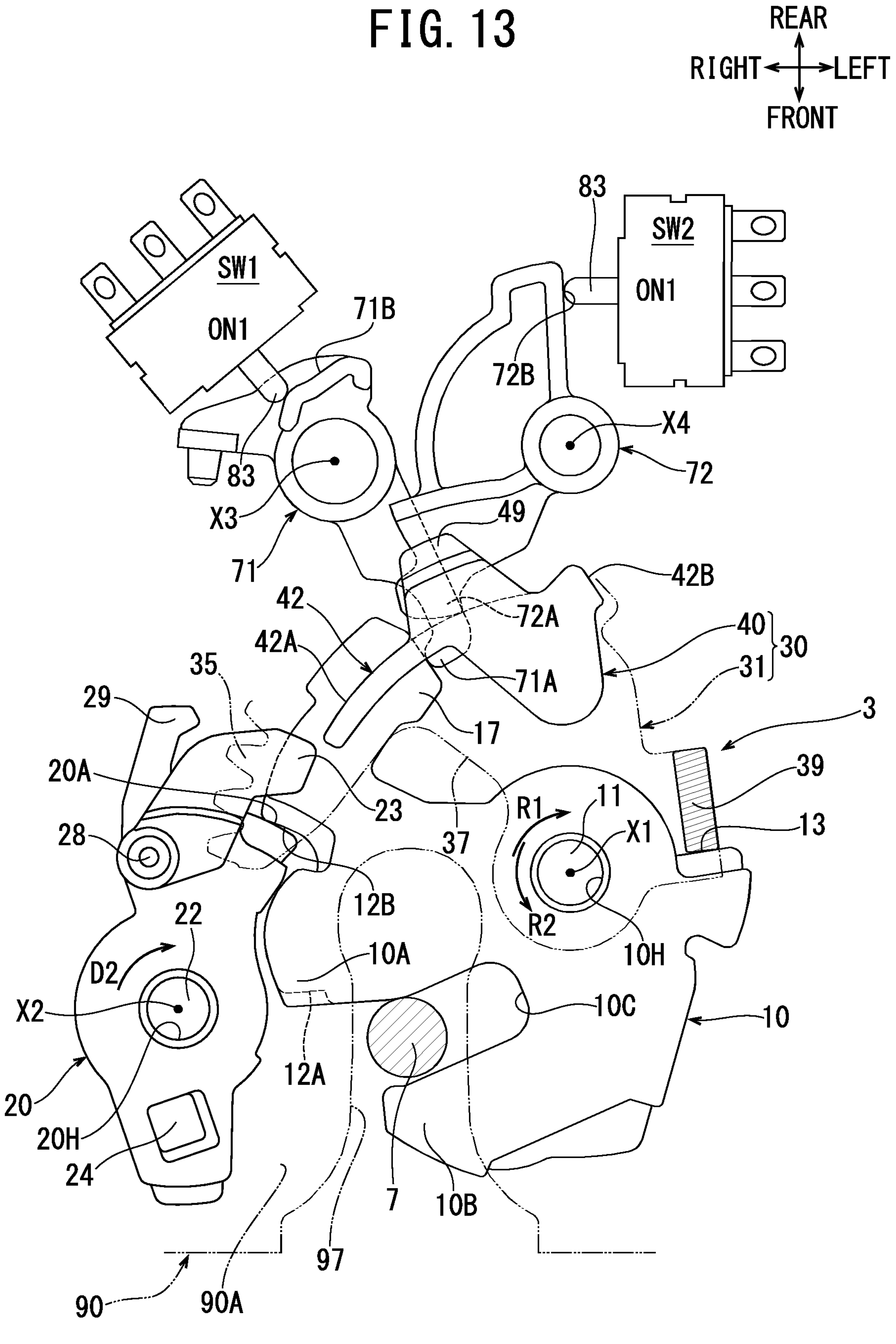
FIG. 13 is a schematic drawing that explains an aspect of the operation of the open/close mechanism.
Figure 14:
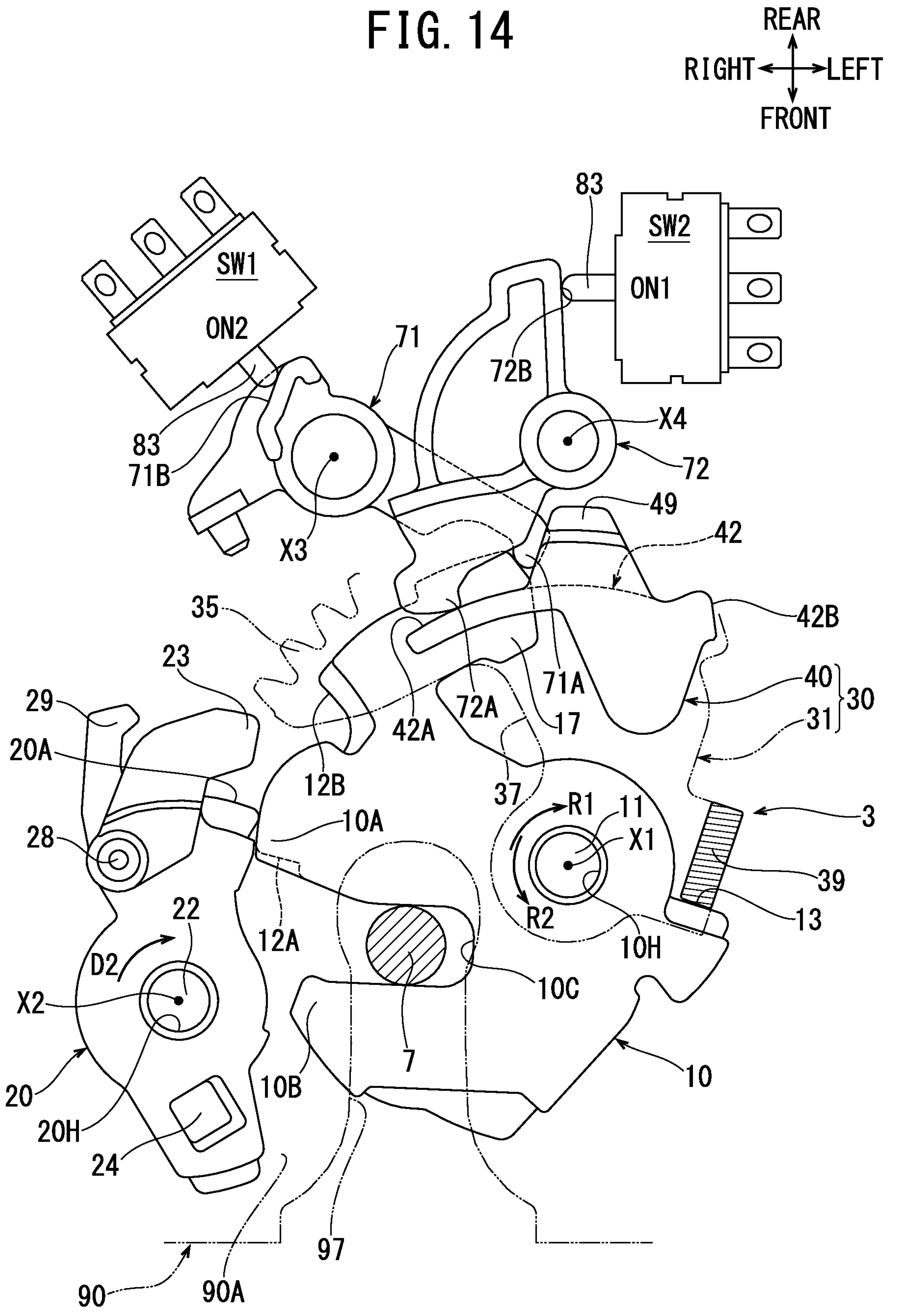
FIG. 14 is a schematic drawing that explains an aspect of the operation of the open/close mechanism.

As shown in FIG. 13 and FIG. 14, the half-latched position of the fork 10 is a position, which is midway in the entry opening 97 and at which the striker 7 is latchable.

Figure 11:
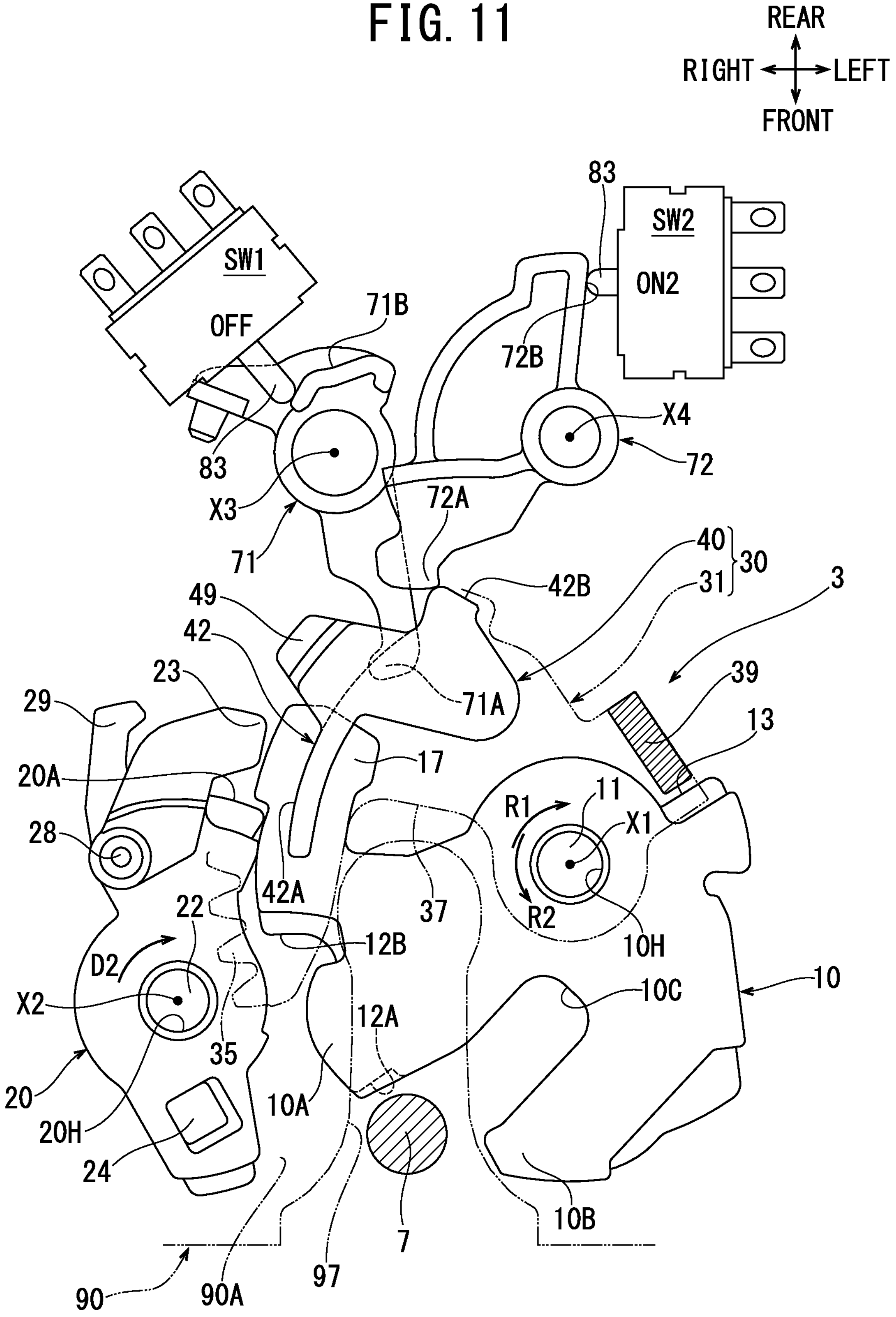
FIG. 11 is a schematic drawing that explains an aspect of the operation of an open/close mechanism.
Figure 12:
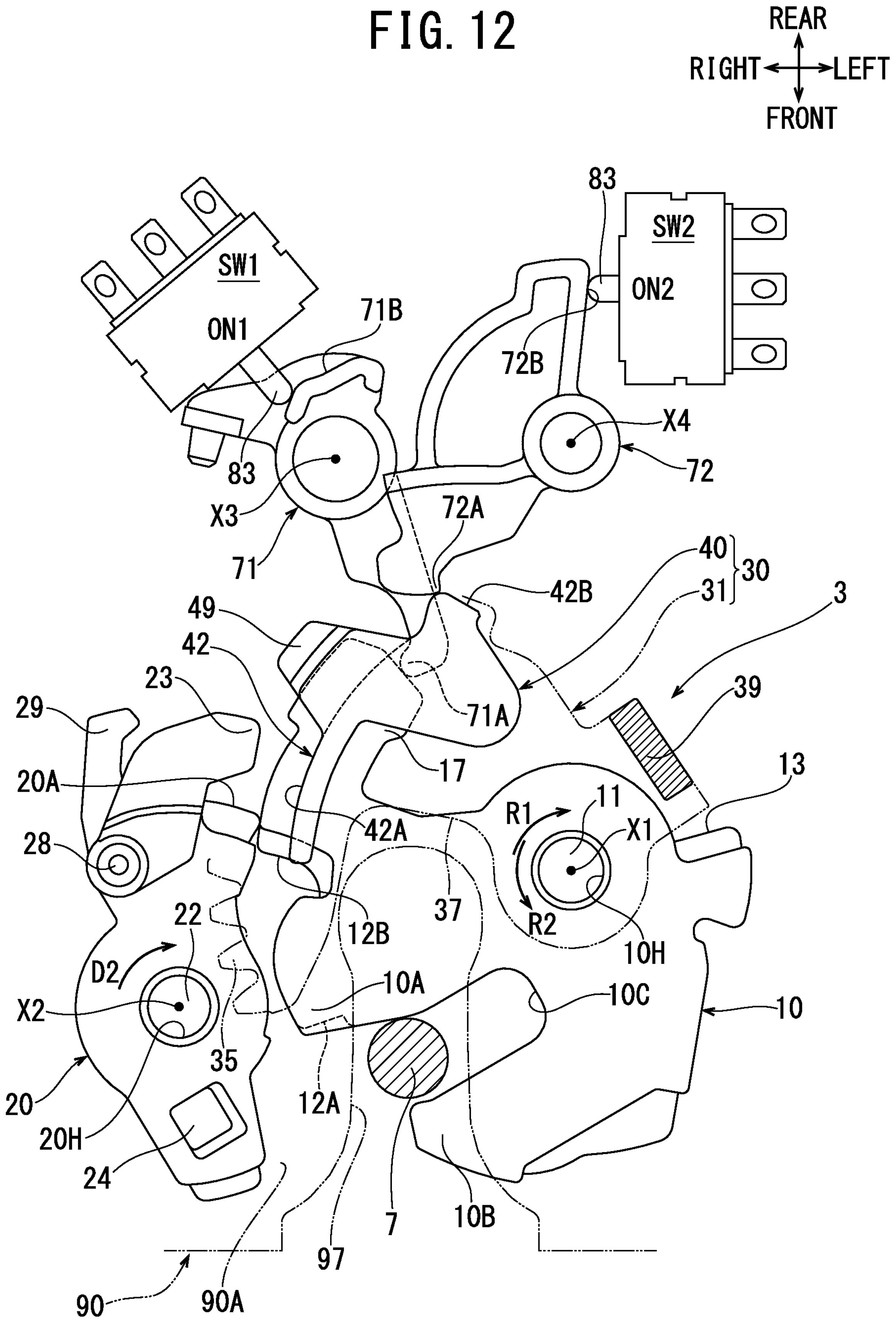
FIG. 12 is a schematic drawing that explains an aspect of the operation of the open/close mechanism.
Figure 18:
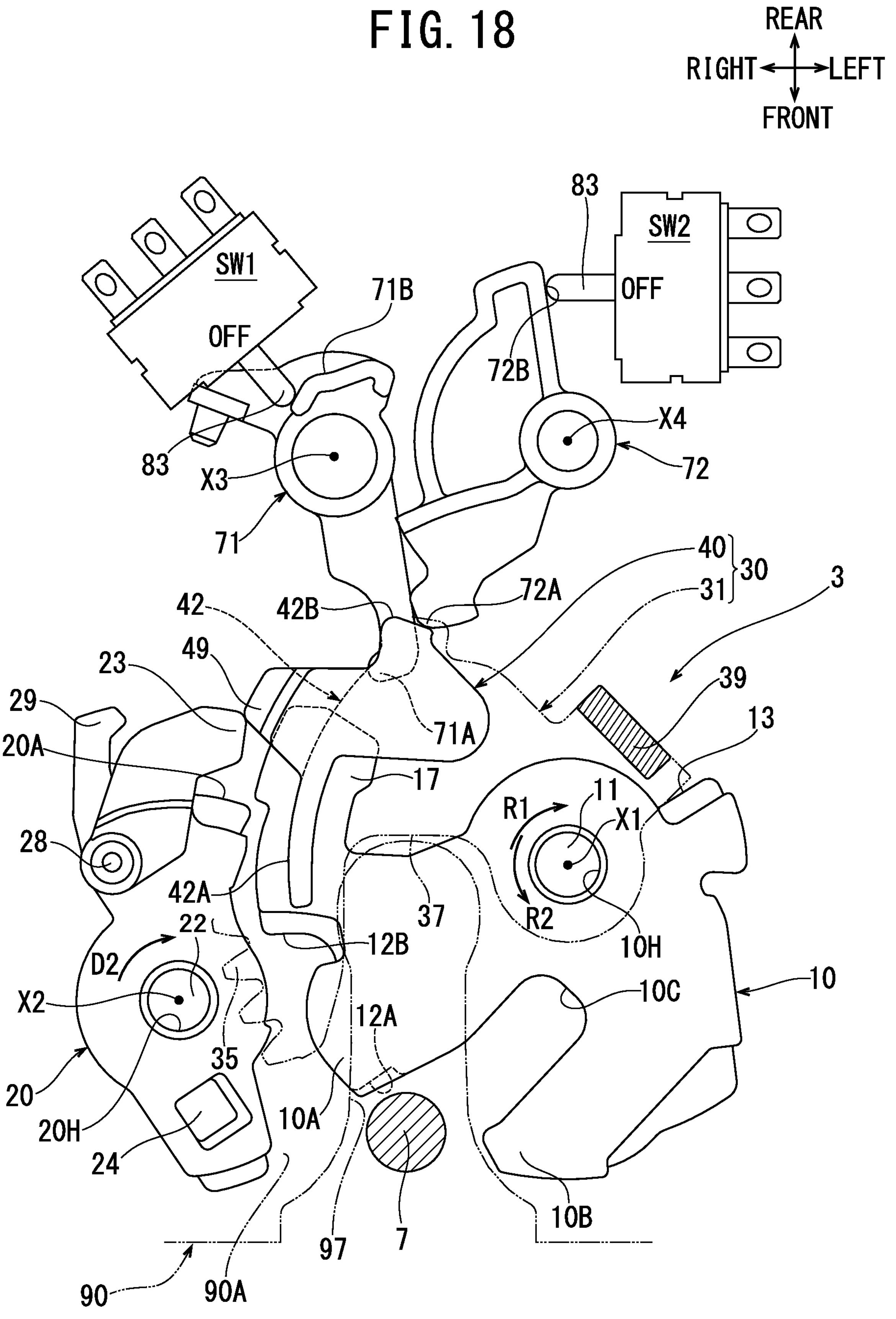
FIG. 18 is a schematic drawing that explains an aspect of the operation of the open/close mechanism.

As shown in FIG. 11, FIG. 12, and FIG. 18, the unlatched position of the fork 10 is a position, which is within the entry opening 97 and at which the striker 7 will (does) not latch.

As shown in FIG. 7 to FIG. 9, an extension part 17 is formed on the outer perimeter of the fork 10. The extension part 17 extends in a substantially arcuate shape in first direction R1 at a location spaced apart from the half-latch surface 12B in first direction R1.

As shown in FIG. 8, a damper 94A is retained on a lower-surface side of the guide base 93. The extension part 17 is capable of abutting on the damper 94A when the fork swings from the unlatched position shown in FIG. 8 to the latched position. The extension part 17 is also capable of abutting on a first contact part 71A of the first detecting lever 71, which is described below. It is noted that the lock apparatus 1 may also be designed according to specifications that do not include the damper 94A; i.e. the damper 94A is optional.

Pawl

As shown in FIG. 7, the pawl 20 is formed including: a thick steel plate, which has recesses, protrusions and the like on its outer perimeter; and a shaft hole 20H, which passes through the steel plate in the thickness direction of the steel plate. Furthermore, the steel plate is covered by a resin in large part.

The pawl 20 is provided on the base member 90 while the pawl 20 is adjacent to the flat-plate part 90A of the base member 90 from above. The pawl 20 is supported on the second support shaft 22 so as to be swingable (pivotable) about second axial center X2 owing to the pawl-support part 22A of the second support shaft 22 being inserted through the shaft hole 20H.

The pawl-support part 22A of the second support shaft 22 is also inserted through the coil portion of the torsion coil spring, which is not shown. The torsion coil spring, which is not shown, urges (biases) the pawl 20 so as to cause the pawl 20 to swing (pivot) about second axial center X2 in pawl-urging direction D2.

As shown in FIG. 7 to FIG. 9, the stopper surface 20A is formed at (on) a region of the pawl 20 that is spaced apart rearward from the shaft hole 20H and is located proximate to the deep end of the entry opening 97.

The stopper surface 20A protrudes toward the rear-side protruding part 10A of the fork 10 and is oriented upstream of (in) second direction R2. The stopper surface 20A is the steel-plate portion of the pawl 20 that is not covered by the resin.

As shown in FIG. 11 to FIG. 18, the pawl 20 swings (pivots) between a blocking position and a non-blocking position by swinging about second axial center X2 in pawl-urging direction D2 and in the reverse of pawl-urging direction D2, respectively.

As shown in FIG. 13, FIG. 15, and FIG. 16, at the blocking position of the pawl 20, the fork 10 is blocked from swinging (pivoting) to the unlatched position, which is shown in FIG. 11, etc., because the stopper surface 20A abuts on the latch surface 12A or on the half-latch surface 12B of the fork 10 or opposes them in a manner capable of abutting from downstream of (in) second direction R2.

As shown in FIG. 13, the tailgate 8 is retained in the almost-closed state when the fork 10 is at (in) the half-latched position and the pawl 20 is at (in) the blocking position. As shown in FIG. 15 and FIG. 16, the tailgate 8 is retained in the completely-closed state when the fork 10 is at (in) the latched position and the pawl 20 is at (in) the blocking position.

As shown in FIG. 11, FIG. 12, FIG. 14, FIG. 17, and FIG. 18, at the non-blocking position of the pawl 20, the fork 10 is allowed (permitted, not blocked) to swing (pivot) to the unlatched position, which is shown in FIG. 11, etc., because the stopper surface is spaced apart from the latch surface 12A and from the half-latch surface 12B of the fork 10 radially outward of first axial center X1 and thereby becomes unable to abut (incapable of abutting) on the latch surface 12A and on the half-latch surface 12B.

As shown in FIG. 7 and FIG. 9, a square-column protruding part 24, a force-receiving part 23, a for-emergency-work protruding part 28, and a for-work protruding part 29 are formed on the resin portion of the pawl 20.

The square-column protruding part 24 is a square-column-shaped protruding portion that protrudes upward from a region of the pawl 20, which is located forward of the shaft hole 20H.

As shown in FIG. 8, a damper 94B is retained on the lower-surface side of the guide base 93. When the pawl 20 swings from the non-blocking position shown in FIG. 8 to the blocking position, the square-column protruding part 24 is capable of abutting on the damper 94B.

As shown in FIG. 7 and FIG. 9, the force-receiving part 23 is the tip of a protruding portion that protrudes rearward and leftward from a region of the pawl 20, which is located rightward and forward of the stopper surface 20A. As shown in FIG. 9, the force-receiving part 23 is located above the stopper surface 20A. The force-receiving part 23 is capable of abutting on a second operation portion 49 of the actuation lever 30, which is described below.

As shown in FIG. 7 and FIG. 9, the for-emergency-work protruding part 28 is a circular column that protrudes upward from a region of the pawl 20, which is located rightward and forward of the stopper surface 20A. As shown in FIG. 4 and FIG. 5, the for-emergency-work protruding part 28 passes through a slotted hole, which is provided such that it passes through the guide base 93, and protrudes upward a short distance (amount) beyond an upper surface of the lock-apparatus main body 5.

As shown in FIG. 1 and FIG. 3, when the vehicle is operating in normal usage, a cover member (cover) 68, which is coupled to the lock-apparatus main body 5 together with the actuator 6, covers the for-emergency-work protruding part 28. When it becomes necessary to manually release the lock apparatus 1 due to a dead vehicle battery or the like, the user or a maintenance worker can remove the cover member 68 and move the exposed for-emergency-work protruding part 28, as shown in FIG. 4 and FIG. 5. This causes the pawl 20 to swing to the non-blocking position, thereby causing the fork 10 to swing to the unlatched position. It is noted that the lock apparatus 1 may also be designed according to specifications that do not include the cover member 68, i.e. the cover member 68 is optional.

As shown in FIG. 7 and FIG. 9, the for-work protruding part 29 protrudes rearward from a region of the pawl 20, which is located rightward of the stopper surface 20A, and the tip thereof bends leftward by a short amount.

Although omitted in the drawings, in the vehicle manufacturing (assembly) process, when a worker mounts the lock apparatus 1 to the lower end of the tailgate 8, the worker can hitch a cord (string, rope), which has been bent into a U shape, to the for-work protruding part 29, and can pull out both ends of the cord to the outside of the tailgate 8. Thereby, in subsequent processes, when the worker opens the tailgate 8 while the lock apparatus 1 is not energized (i.e., before a battery is connected), pulling both ends of the cord causes the pawl 20 to swing to the non-blocking position, thereby causing the fork 10 to swing to the unlatched position. The worker can remove the cord by pulling only one end of the cord.

Actuation Lever

As shown in FIG. 7, the actuation lever 30, the fork 10 and the pawl 20 are located between the base member 90 and the backplate 95.

As shown in FIG. 6, FIG. 7, and FIG. 9, the actuation lever 30 comprises an actuation-lever main body 31 and a cam 40. As shown in FIG. 7 and FIG. 9, the actuation-lever main body 31 and the cam 40 are integrally coupled by a screw 30B.

As shown in FIG. 7, the actuation-lever main body 31 is formed by punching and bending a steel plate, and has a shaft hole 31H, which passes through the steel plate in the thickness direction of the steel plate.

The actuation-lever main body 31 is located above the fork 10 and the coil portion of the torsion coil spring, which urges (biases) the fork 10 and is not shown. The actuation-lever main body 31 is supported on the first support shaft 11 so as to be swingable (pivotable) about first axial center X1 owing to the actuation-lever support part 11B of the first support shaft 11 being inserted through the shaft hole 31H.

That is, because the actuation-lever main body 31 is supported on the first support shaft 11, the actuation lever 30 is supported in a swingable manner on the base member 90 coaxial with the fork 10. The actuation lever 30 is swingable in first direction R1 and in second direction R2, independently of the fork 10.

The actuation-lever main body 31 comprises the first operation portion 39 and a sector gear 35.

The first operation portion 39 is a portion that bends and protrudes downward from a region of the actuation-lever main body 31, which is located leftward and rearward of the shaft hole 31H. As shown in FIG. 8 and FIG. 9, the first operation portion 39 opposes the force-receiving surface 13 of the fork 10 in a manner capable of abutting on the force-receiving surface 13 from upstream in first direction R1.

As shown in FIG. 13 to FIG. 15, when the actuation lever 30 swings in first direction R1, the first operation portion 39 abuts on the force-receiving surface 13 of the fork 10, thereby causing the fork 10 to swing from the half-latched position or a position slightly before the half-latched position to the latched position.

As shown in FIG. 6, FIG. 7, and FIG. 9, the sector gear 35 is a plurality of gear teeth that spans from a region of the actuation-lever main body 31 that is located rightward of the entry opening 97 to a region that is located rearward of the entry opening 97 and is formed such that the gear teeth are arranged in the circumferential direction of first axial center X1.

As shown in FIG. 6, the sector gear 35 meshes with an output gear 55 of the drive train 50, which is described below. As shown in FIG. 6, FIG. 11, FIG. 12, and FIG. 16 to FIG. 18, when at least the actuation lever 30 swings in second direction R2, the sector gear becomes interposed between the first support shaft 11 and the second support shaft 22.

It is noted that, to make the drawings in FIG. 11 to FIG. 18 easier to view and understand, the portions of the actuation-lever main body 31 that are located more on the near side of the paper plane than the fork 10, the pawl 20, and the cam 40 are illustrated by virtual lines (chain double-dashed lines), and a portion of the sector gear 35 is omitted.

As shown in FIG. 6 and FIG. 7, a circumvention portion 37 is formed in the actuation-lever main body 31. The circumvention portion 37 is recessed rearward between the sector gear 35 and the first support shaft 11. As shown in FIG. 16 and FIG. 17, the circumvention portion 37 is recessed in first direction R1 so as to circumvent the striker 7 when the striker 7 enters the entry opening 97.

As shown in FIG. 7, the cam 40 is a resin-molded product manufactured by injection molding, or the like, of a thermoplastic resin. The cam 40 comprises a positioning, protruding part 40D and a through hole 40E. The actuation-lever main body 31 has a positioning hole 31D and a screw hole 31E. The screw hole 31E is formed by burring (forming a cylinder on) a portion of the actuation-lever main body 31 near the positioning hole 31D and then forming a female thread on (along) the inner-circumferential surface of the cylinder resulting from the burring.

As shown in FIG. 7 and FIG. 9, the cam 40 is integrally coupled to the actuation-lever main body 31 in the state in which the cam 40 is precisely positioned by fitting the positioning, protruding part 40D, which is adjacent to the actuation-lever main body 31 from below, into the positioning hole 31D, and thereafter by passing the screw 30B through the through hole 40E from below and screwing it into the screw hole 31E.

The cam 40 comprises the second operation portion 49 and a sliding-contact surface 42.

The second operation portion 49 is a substantially trapezoidal cam that is located below a rearward region of the sector gear 35 and protrudes radially outward of first axial center X1. As shown in FIG. 9, the second operation portion 49 opposes the force-receiving part 23 of the pawl 20 in a manner capable of abutting on the force-receiving part 23 from upstream in second direction R2.

As shown in FIG. 17 and FIG. 18, when the actuation lever 30 swings in second direction R2, the second operation portion 49 abuts on the force-receiving part 23 of the pawl 20, thereby causing the pawl 20 to swing from the blocking position to the non-blocking position.

As shown in FIG. 7 and FIG. 9, the sliding-contact surface 42 is located below the sector gear 35 and the second operation portion 49, and has a first sliding-contact surface 42A and a second sliding-contact surface 42B.

As shown in FIG. 9 and FIG. 11, the first sliding-contact surface 42A is a curved surface that extends in an arcuate shape in the circumferential direction of first axial center X1 while being oriented radially outward of first axial center X1. The first sliding-contact surface 42A extends rearward by a short amount beyond the second operation portion 49. The first sliding-contact surface 42A also extends forward in an elongated manner beyond the second operation portion 49.

The second sliding-contact surface 42B is connected to the rear end of the first sliding-contact surface 42A. The second sliding-contact surface 42B is composed of a pair of tilted surfaces and a vertex, which are at a substantially triangular protruding portion that protrudes radially outward of first axial center X1.

The first sliding-contact surface 42A and the second sliding-contact surface 42B make sliding contact with a second sliding-contact part 72A of the second detecting lever 72, which is described below.

First Microswitch and Second Microswitch

As shown in FIG. 5, the first microswitch SW1 is retained by a retaining portion, which is provided recessed in a corner portion in a rear right area of the guide base 93. The second microswitch SW2 is retained by a retaining portion, which is provided recessed in a corner portion in a rear left area of the guide base 93.

Three terminals of the first microswitch SW1 and three terminals of the second microswitch SW2 are connected to a wire harness WH1. The wire harness WH1 comprises five connector terminals WH1A, which are for transmitting detection signals, at an end portion of the wire harness WH1 on the side opposite of the first microswitch SW1 and the second microswitch SW2.

One of the connector terminals WH1A is a ground terminal, which is shared by the first microswitch SW1 and the second microswitch SW2. As shown in FIG. 3 and FIG. 4, each of the connector terminals WH1A is disposed within the connector 65, which is described below.

Figures 10A, 10B, 10C:
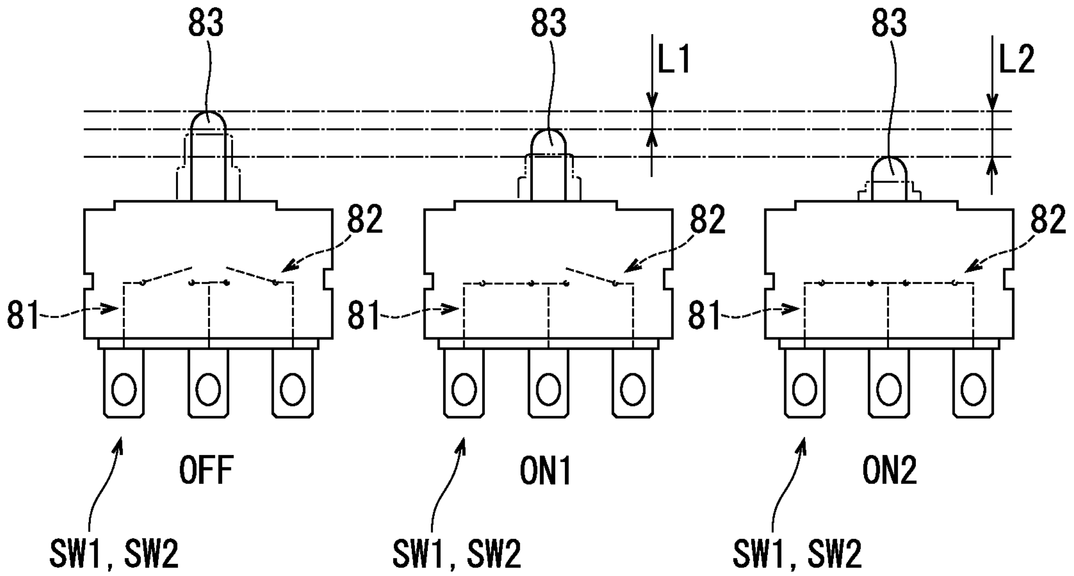
FIGS. 10A, 10B and 10C are schematic drawings that respectively explain, for each of the first and second microswitches, a position where a movable projection (83) is not pushed in (FIG. 10A); a first stroke amount, by which the movable projection (83) is pushed in (FIG. 10B); and a second stroke amount, by which the movable projection (83) is pushed in further (deeper) than the first stroke amount (FIG. 10C).

As shown in FIG. 10A, FIG. 10B, and FIG. 10C, the first microswitch SW1 and the second microswitch SW2 are each a two-circuit microswitch comprising a movable projection 83, a first circuit 81, and a second circuit 82.

The movable projection 83 is supported in a linearly movable manner in a switch housing. The movable projection 83 is biased by a biasing spring, which is not shown, such that it protrudes from the switch housing, and is capable of being pushed in against the biasing spring.

In the state in which nothing is in contact with the movable projection 83, or in the state in which, even though something is in contact with the movable projection 83, the amount of push-in force that would push in (move) the movable projection 83 against the biasing spring is not being applied to the movable projection 83, the movable projection 83 is at the position shown in FIG. 10A.

As shown in FIG. 10B, the first circuit 81 switches between connection and disconnection at first stroke amount L1, by which the movable projection 83 is pushed in. That is, when the movable projection 83 has been pushed in by a stroke amount that is less than first stroke amount L1, the first circuit 81 is in the disconnected state. On the other hand, when the movable projection 83 has been pushed in by a stroke amount that is equal to first stroke amount L1 or greater, the first circuit 81 is in the connected state.

As shown in FIG. 10C, the second circuit 82 switches between connection and disconnection at second stroke amount L2, by which the movable projection 83 is pushed in further from (deeper than) first stroke amount L1. That is, when the stroke amount by which the movable projection 83 is (has been) pushed in is less than second stroke amount L2, the second circuit 82 is in the disconnected state. On the other hand, when the stroke amount by which the movable projection 83 is (has been) pushed in is second stroke amount L2 or greater, the second circuit 82 is in the connected state.

As shown in FIG. 10A, the state in which the stroke amount by which the movable projection 83 is (has been) pushed in is less than first stroke amount L1 and thus the first circuit 81 and the second circuit 82 are in the disconnected state is referred to as the “OFF” state.

As shown in FIG. 10B, the state in which the stroke amount by which the movable projection 83 is (has been) pushed in is first stroke amount L1 or greater and less than second stroke amount L2 and thus the first circuit 81 is in the connected state but the second circuit 82 is in the disconnected state is referred to as the “ON1” state.

As shown in FIG. 10C, the state in which the stroke amount by which the movable projection 83 is (has been) pushed in is second stroke amount L2 or greater and thus the first circuit 81 and the second circuit 82 are both in the connected state is referred to as the "ON2" state.

First Detecting Lever

As shown in FIG. 7, the first detecting lever 71 is a resin-molded product manufactured by injection molding, or the like, of a thermoplastic resin. As shown in FIG. 8, the first detecting lever 71 is located on a lower-surface side and a rear-end side of the guide base 93.

The first detecting lever 71 is supported on the guide base 93 and is swingable about third axial center X3 between the movable projection 83 of the first microswitch SW1 and the extension part 17 of the fork 10. The first detecting lever 71 is biased by a compression-coil spring 71S such that it swings in the counterclockwise direction in FIG. 8.

The first detecting lever 71 comprises the first contact part 71A, which is shown in FIG. 7 to FIG. 9, and a first sliding-contact part 71B, which is shown in FIG. 5 to FIG. 7 and FIG. 9.

As shown in FIG. 7 and FIG. 9, the first contact part 71A is the tip of a protruding portion that is located forward of third axial center X3 and protrudes forwardly. The first contact part 71A faces the extension part 17 of the fork 10 in a manner capable of abutting on the extension part 17 from downstream of (in) first direction R1.

The first sliding-contact part 71B is a curved surface of an upper portion of a substantially plate-shaped piece (of the first detecting lever 71) that is located rearward of third axial center X3 and protrudes upwardly. The first sliding-contact part 71B is oriented radially outward of third axial center X3. As shown in FIG. 6, the first sliding-contact part 71B is located on an upper-surface side of the guide base 93 and makes sliding contact with the movable projection 83 of the first microswitch SW1.

As shown in FIG. 11 to FIG. 18, the first detecting lever 71 transmits the swing (pivoting movement) of the fork 10 to the movable projection 83 of the first microswitch SW1 via the first contact part 71A and the first sliding-contact part 71B.

The first microswitch SW1 is configured to detect, via the first detecting lever 71, that the fork 10 is at (in) any one of the positions among the latched position, which is shown in FIG. 15 to FIG. 17; the half-latched position, which is shown in FIG. 13 and FIG. 14; and the unlatched position, which is shown in FIG. 11, FIG. 12, and FIG. 18.

When the fork 10 is at the latched position shown in FIG. 15, etc., the first microswitch SW1 is in the "ON2" state.

When the fork 10 is at the half-latched position shown in FIG. 13, etc., the first microswitch SW1 is in the "ON1" state.

When the fork 10 is at the unlatched position shown in FIG. 11, etc., the first microswitch SW1 is in the "OFF" state.

It is noted that, in the working example, an assembly error or other errors may result from an incorrect relative positional relationship between the first microswitch SW1, the first detecting lever 71, and the fork 10. This may cause a failure (detection error) in which it is determined that the fork 10 has not reached the half-latched position even though it has. To avoid such a failure (detection error), the first microswitch SW1 is set such that it enters the "ON1" state when the fork 10 has reached a position slightly before the half-latched position.

Additionally, in the working example, an assembly error or other errors may result from an incorrect relative positional relationship between the first microswitch SW1, the first detecting lever 71, and the fork 10. This may cause a failure (detection error) in which it is determined that the fork 10 has not reached the latched position even though it has. To avoid such a failure (detection error), the first microswitch SW1 is set such that it enters the "ON2" state when the fork 10 has reached a position slightly before the latched position.

Second Detecting Lever

As shown in FIG. 7, the second detecting lever 72 is a resin-molded product manufactured by injection molding, or the like, of a thermoplastic resin. As shown in FIG. 6, the second detecting lever 72 is located on an upper-surface side and a rear-end side of the guide base 93.

The second detecting lever 72 is supported on the guide base 93 and is swingable about fourth axial center X4 between the movable projection 83 of the second microswitch SW2 and the sliding-contact surface 42 of the cam 40 of the actuation lever 30.

The second detecting lever 72 comprises the second sliding-contact part 72A, which is shown in FIG. 6, FIG. 7, and FIG. 9, and a second contact part 72B, which is shown in FIG. 5 to FIG. 7 and FIG. 9.

As shown in FIG. 7, the second sliding-contact part 72A is the tip of a projection, which is located forward and rightward of fourth axial center X4 and protrudes forwardly. As shown in FIG. 6 and FIG. 9, the second sliding-contact part 72A makes sliding contact with the sliding-contact surface 42 of the cam 40 of the actuation lever 30.

As shown in FIG. 7, the second contact part 72B is a flat surface of a portion that is located rearward of fourth axial center X4 and is oriented leftward. As shown in FIG. 6 and FIG. 9, the second contact part 72B abuts on the movable projection 83 of the second microswitch SW2.

The biasing spring, which biases the movable projection 83 and is not shown, pushes the second contact part 72B rightward, thereby causing the second sliding-contact part 72A to be continuously in contact with the sliding-contact surface 42.

As shown in FIG. 11 to FIG. 18, the second detecting lever 72 transmits the swing (pivoting movement) of the actuation lever 30 to the movable projection 83 of the second microswitch SW2 via the second sliding-contact part 72A and the second contact part 72B.

As shown in FIG. 11 to FIG. 18, by swinging (pivoting) in first direction R1 and second direction R2 about first axial center X1, the actuation lever 30 is swingable (pivotable) along a pivot range that includes an origin position, a first actuation-end position, a second actuation-end position, a first intermediate position, and a second intermediate position.

As shown in FIG. 11, FIG. 12, and FIG. 16, the origin position of the actuation lever 30 is the position at which only the front end of the sector gear 35 becomes interposed between the first support shaft 11 and the second support shaft 22.

When the actuation lever 30 is at (in) the origin position, the first operation portion 39 is spaced apart from the force-receiving surface 13 of the fork 10 and is located upstream of the force-receiving surface 13 in first direction R1, and the second operation portion 49 is spaced apart from the force-receiving part 23 of the pawl 20 and is located upstream of the force-receiving part 23 in second direction R2. Additionally, when the actuation lever 30 is at the origin position, the second sliding-contact part 72A of the second detecting lever 72 abuts on the vertex of the second sliding-contact surface 42B.

As shown in FIG. 15, the first actuation-end position of the actuation lever 30 is the limit (end) position when the actuation lever 30 swings from the origin position in first direction R1.

When the actuation lever 30 is at (in) the first actuation-end position, the first operation portion 39 abuts on the force-receiving surface 13 of the fork 10, the fork 10 is at the latched position, and the latch surface 12A is slightly spaced apart from the stopper surface 20A of the pawl 20, which is at the blocking position, and is located downstream of the stopper surface 20A in first direction R1. Additionally, when the actuation lever 30 is at (in) the first actuation-end position, the second sliding-contact part 72A of the second detecting lever 72 engages with one end of the first sliding-contact surface 42A, which is located upstream in first direction R1.

As shown in FIG. 18, the second actuation-end position of the actuation lever 30 is the limit (end) position when the actuation lever 30 swings from the origin position in second direction R2.

When the actuation lever 30 is at the second actuation-end position, the second operation portion 49 abuts on the force-receiving part 23 of the pawl 20, and the pawl 20 is at the non-blocking position. Additionally, when the actuation lever 30 is at the second actuation-end position, the second sliding-contact part 72A of the second detecting lever 72 abuts on one end of the second sliding-contact surface 42B, which is located downstream in first direction R1.

As shown in FIG. 13 and FIG. 14, the first intermediate position of the actuation lever 30 is a position in a position range between the origin position and the first actuation-end position.

When the actuation lever 30 swings in the position range containing the first intermediate position, the second sliding-contact part 72A of the second detecting lever 72 makes sliding contact with the tilted surface of the second sliding-contact surface 42B, which is located on the first sliding-contact surface 42A side of the vertex, or makes sliding contact with the first sliding-contact surface 42A.

As shown in FIG. 17, the second intermediate position of the actuation lever is a position in a position range between the origin position and the second actuation-end position.

When the actuation lever 30 swings in the position range containing the second intermediate position, the second sliding-contact part 72A of the second detecting lever 72 makes sliding contact with the tilted surface of the second sliding-contact surface 42B, which is located on the side opposite the first sliding-contact surface 42A with respect to the vertex of the second sliding-contact surface 42B.

Each of the first actuation-end position and the second actuation-end position is referred to as an actuation-end position, and each of the first intermediate position and the second intermediate position is referred to as an intermediate position.

The second microswitch SW2 is configured to detect, via the second detecting lever 72, that the actuation lever 30 is at (in) any one of the positions among the origin position, which is shown in FIG. 11, FIG. 12, and FIG. 16, the actuation-end positions, which are shown in FIG. 15 and FIG. 18, and the intermediate positions, which are shown in FIG. 13, FIG. 14, and FIG. 17.

When the actuation lever 30 is at the origin position, which is shown in FIG. 11, etc., the second microswitch SW2 is in the "ON2" state.

When the actuation lever 30 is at one of the intermediate positions shown in FIG. 13, etc., the second microswitch SW2 is in the "ON1" state.

When the actuation lever 30 is at one of the actuation-end positions shown in FIG. 15, etc., the second microswitch SW2 is in the "OFF" state.

Actuator Case, Actuator Cover, Connector, Drive Source, and Drive Train

As shown in FIG. 3, the actuator case 61 and the actuator cover 69 are each a resin-molded product manufactured by injection molding, or the like, of a thermoplastic resin.

The actuator cover 69 is assembled onto the actuator case 61 from above and is integrally coupled to the actuator case 61 by a plurality of screws 69B.

In the state in which a front portion of the actuator case 61 and a front portion of the actuator cover 69 overlap a region of the lock-apparatus main body 5, which is located rearward of the entry opening 97, from above, the actuator case 61 and the actuator cover 69 are integrally coupled to the lock-apparatus main body 5 by a plurality of screws 61B.

A rear portion of the actuator case 61 and a rear portion of the actuator cover 69 are located rearward of the rear end of the lock-apparatus main body 5, extend leftward beyond the lock-apparatus main body 5, and sandwich the connector 65.

As shown in FIG. 4, the wire harness WH1 is pulled into an interior space 61A, which is bounded by the actuator case 61 and the actuator cover 69, and each of the connector terminals WH1A is disposed within the connector 65.

The drive source M1 is housed in the interior space 61A. The drive source M1 is an electric motor having a motor shaft that is rotatable in a first (forward) rotational direction and in a second (reverse) rotational direction, which is opposite of the first (forward) rotational direction. Two terminals of the drive source M1 are respectively electrically connected to two connector terminals WH1B, which are for supplying electric power. The connector terminals WH1B are disposed above the connector terminals WH1A within the connector 65.

As shown in FIG. 2, the connector terminals WH1A, WH1B within the connector 65 are electrically connected to the control part C1 via a wire harness, which is not shown.

Under the control of the control part C1, the drive source M1 is supplied with electric power and the polarity of the supplied electric power is switched as appropriate. Thereby, the drive source M1 rotates forwardly (i.e. the motor shaft rotates in the first rotational direction) to thereby generate a first driving force or reversely (i.e. the motor shaft rotates in the second rotational direction) to thereby generate a second driving force.

The first microswitch SW1 transmits a detection signal, which corresponds to the "OFF," "ON1," or "ON2" state, to the control part C1. In response to the detection signal, the control part C1 appropriately determines that the fork 10 is at (in) the latched position, the half-latched position, or the unlatched position.

The second microswitch SW2 also transmits the detection signal, which corresponds to the "OFF," "ON1," or "ON2" state, to the control part C1. In response to the detection signal, the control part C1 appropriately determines that the actuation lever 30 is at (in) the origin position, one of the actuation-end positions, or one of the intermediate positions.

Furthermore, the control part C1 appropriately determines the state of the lock apparatus 1 based on a combination of a determination result regarding the position of the fork 10 and a determination result regarding the position of the actuation lever 30.

For example, when the control part C1 has determined that the actuation lever 30 is at (in) one of the actuation-end positions, the control part C1 appropriately determines that the actuation lever 30 is at (in) one of the first actuation-end position and the second actuation-end position by referring to the determination result regarding the position of the fork 10.

When the control part C1 has determined that the actuation lever 30 is at one of the intermediate positions, the control part C1 appropriately determines that the actuation lever 30 is at (in) the first intermediate position. This is based on: (i) the control record that the state in which the actuation lever 30 is at the origin position switches to the state in which the drive source M1 has rotated forwardly (i.e. the motor shaft has rotated in the first rotational direction); or (ii) the control record that the state in which the actuation lever 30 is (was) at the origin position switches to the state in which the drive source M1 has rotated forwardly (i.e. the motor shaft has rotated in the first rotational direction) and then has rotated reversely (i.e. the motor shaft has rotated in the second rotational direction). Furthermore, when the control part C1 has determined that the actuation lever 30 is at one of the intermediate positions, the control part C1 appropriately determines that the actuation lever is at (in) the second intermediate position. This is based on: (i) the control record that the state in which the actuation lever 30 is (was) at the origin position switches to the state in which the drive source M1 has rotated reversely (i.e. the motor shaft has rotated in the second rotational direction); or (ii) the control record that the state in which the actuation lever 30 is at the origin position switches to the state in which the drive source M1 has rotated reversely (i.e. the motor shaft has rotated in the second rotational direction) and then has rotated forwardly (i.e. the motor shaft has rotated in the first rotational direction).

When the control part C1 has determined that the actuation lever 30 is at one of the intermediate positions, if the control part C1 determines that the drive source M1 has rotated forwardly (i.e. the motor shaft has rotated in the first rotational direction) and then the actuation lever 30 is at one of the actuation-end positions, the control part C1 appropriately determines that the actuation lever 30 is at the first actuation-end position.

As shown in FIG. 4, the drive train 50 comprises: a worm gear 51, a worm wheel 52, and transmission gears 53, 54, which are housed in the interior space 61A; and the output gear 55, the upper portion of which is housed in the interior space 61A as shown in FIG. 4 and the lower portion of which enters into the lock-apparatus main body 5 as shown in FIG. 5.

As shown in FIG. 4, the worm gear 51 is fixed to a drive shaft, which protrudes rightward from the drive source M1, and rotates integrally with the drive shaft. The worm wheel 52 is located forward of the worm gear 51 and meshes with the worm gear 51.

The transmission gear 53 is a small-diameter gear, which is formed integrally with a lower-surface side of the worm wheel 52, and rotates integrally with the worm wheel 52. The transmission gear 54 is located forward and leftward of the transmission gear 53 and meshes with the transmission gear 53.

An upper portion of the output gear 55 is fit and fixed in a center portion of the transmission gear 54. Although not shown in the drawings, a lower portion of the output gear 55 passes through an opening, which is provided such that it passes through a lower wall of the actuator case 61, and protrudes downward.

As shown in FIG. 5, the lower portion of the output gear 55 passes through the opening, which is provided such that it passes through the backplate 95, and meshes with the sector gear 35 of the actuation lever 30. The output gear 55 is the gear of the drive train 50 to which the first driving force or the second driving force is last transmitted.

The drive train 50 transmits the first driving force from the drive source M1 (i.e. the motor shaft that rotates in the first rotational direction) to the worm gear 51, the worm wheel 52, the transmission gears 53, 54, the output gear 55, and then the sector gear 35 of the actuation lever 30, thereby causing the actuation lever 30 to swing (pivot) in first direction R1.

On the other hand, the drive train 50 transmits the second driving force from the drive source M1 (i.e. the motor shaft that rotates in the second rotational direction) to the worm gear 51, the worm wheel 52, the transmission gears 53, 54, the output gear 55, and then the sector gear 35 of the actuation lever 30, thereby causing the actuation lever 30 to swing (pivot) in second direction R2.

When the actuation lever 30 is at the first actuation-end position or the first intermediate position, a problem such as a dead battery may occur while the first operation portion 39 abuts on the force-receiving surface 13 of the fork 10. In such a case, even if the user or the maintenance worker manually moves the for-emergency-work protruding part 28 according to the procedure described above to cause the pawl 20 to swing to the non-blocking position, the fork 10 cannot swing to the unlatched position. This is because the sector gear receives resistance from the drive train 50. In this situation, the user or the maintenance worker can remove the plurality of screws 61B, which is shown in FIG. 3, separate the actuator 6 together with the output gear 55 from the lock-apparatus main body 5, and then manually move the for-emergency-work protruding part 28. This causes the pawl 20 to swing to the non-blocking position and thereby causes the fork 10 to swing to the unlatched position.

When the actuation lever 30 is at the second actuation-end position or the second intermediate position, a problem such as a dead battery may occur while the second operation portion 49 abuts on the force-receiving part 23 of the pawl 20. In such a case, the tailgate 8 can no longer be retained in the closed state. This is because the pawl 20 receives resistance from the actuation lever 30 and therefore cannot swing to the blocking position. In this situation as well, if the user or the maintenance worker separates the actuator 6 from the lock-apparatus main body 5 in the same manner as described above, the pawl 20 no longer receives resistance from the actuation lever 30 and therefore swings to the blocking position.

Operation of the Open/Close Mechanism

The open/close mechanism 3 of the above-described configuration (embodiment) is configured such that, if the second operation portion 49 acts on the force-receiving part 23 of the pawl 20, the pawl 20 is swung to the non-blocking position, whereas, if the first operation portion 39 acts on the force-receiving surface 13 of the fork 10, the fork 10 is swung from the half-latched position or a position slightly before the half-latched position to the latched position.

As described in detail below, when the user closes the (open) tailgate 8, the first microswitch SW1 transmits the current state thereof to the control part C1. Then, the control part C1 controls the open/close mechanism 3 to cause the lock apparatus 1 to completely close the tailgate 8.

On the other hand, for example, as described in detail below, when the user manually operates the door handle (doorknob), which is provided on the tailgate 8 and not shown, to open the tailgate 8, or when the user operates the remote-control switch (key fob) or the like to open the tailgate 8, the tailgate-opening-operation detecting part S1 transmits information that the opening operation has been performed, to the control part C1. Then, the control part C1 controls the open/close mechanism 3 to cause the lock apparatus 1 to make the tailgate 8 openable.

State of the Lock Apparatus when the Tailgate is Open

As shown in FIG. 11, when the tailgate 8 is open, in the lock apparatus 1, the fork 10 is at (in) the unlatched position, the pawl 20 is at (in) the non-blocking position, and the actuation lever 30 is at (in) the origin position. The first microswitch SW1 is in the "OFF" state, and the second microswitch SW2 is in the "ON2" state. The control part C1 determines that the tailgate 8 is open based on the detection signals transmitted from the first microswitch SW1 and the second microswitch SW2.

Operation that Completely Closes the Tailgate

When the user closes the (open) tailgate 8, as shown in FIG. 12, the striker 7 enters the entry opening 97. The striker 7 pushes the rear-side protruding part 10A of the fork 10 and thereby causes the fork 10 to swing in first direction R1.

Then, when the fork 10 has swung to a position slightly before the half-latched position, the first microswitch SW1 transitions to the "ON1" state and thereby transmits the corresponding detection signal to the control part C1. The control part C1 determines that the tailgate 8 has almost closed, thereby causing the drive source M1 to rotate forwardly (i.e. the motor shaft rotates in the first rotational direction).

As shown in FIG. 13, the drive train 50 transmits the first driving force from the drive source M1 (i.e. the motor shaft that rotates in the first rotational direction) to the sector gear 35, thereby causing the actuation lever 30 to swing (pivot) from the origin position in first direction R1.

When the actuation lever 30 swings in the position range containing the first intermediate position in first direction R1, the first operation portion 39 abuts on the force-receiving surface 13 of the fork 10, thereby causing the fork 10 to swing from the half-latched position or a position slightly before the half-latched position to the latched position.

When the actuation lever 30 moves into the position range containing the first intermediate position, the second microswitch SW2 transitions to the "ON1" state and thereby transmits the corresponding detection signal to the control part C1. The control part C1 determines that the actuation lever 30 has started moving from the origin position toward the first actuation-end position and that the fork 10 has started swinging from the half-latched position or a position slightly before the half-latched position toward the latched position.

When the fork 10 reaches the half-latched position, the pawl 20 swings to the blocking position, and the stopper surface 20A opposes the half-latch surface 12B of the fork in a manner capable of abutting on the half-latch surface 12B from downstream of (in) second direction R2. Then, when the fork 10 further swings from the half-latched position in first direction R1, the pawl 20 makes sliding contact with an outer-perimeter surface of the fork 10, which curves between the half-latch surface 12B and the latch surface 12A, and therefore swings to the non-blocking position.

As shown in FIG. 14, when the actuation lever 30 further swings into the position range containing the first intermediate position in first direction R1 and the fork 10 passes a position slightly before the latched position, the first microswitch SW1 transitions to the "ON2" state and thereby transmits the corresponding detection signal to the control part C1. The control part C1 determines that the fork 10 has almost reached the latched position. It is noted that, with regard to the control part C1, the switching signal of the first microswitch SW1 from the "ON1" state to the "ON2" state is also usable to turn ON or OFF a vehicle cabin lamp.

As shown in FIG. 15, when the actuation lever 30 further swings in first direction R1 and reaches the first actuation-end position, the pawl 20 swings to the blocking position, and the stopper surface 20A of the pawl 20 opposes the latch surface 12A of the fork which is at the latched position, in a manner capable of abutting on the latch surface 12A from downstream of (in) second direction R2.

The second microswitch SW2 transitions to the "OFF" state and thereby transmits the corresponding detection signal to the control part C1. The control part C1 determines that the fork 10 has reached and overrun the latched position. Then, the control part C1 causes the drive source M1 to rotate reversely (i.e. the motor shaft rotates in the second rotational direction).

As shown in FIG. 16, the drive train 50 transmits the second driving force from the drive source M1 (i.e. the motor shaft that rotates in the second rotational direction) to the sector gear 35, thereby causing the actuation lever 30 to swing from the first actuation-end position in second direction R2.

Then, the second microswitch SW2 transitions to the "ON1" state when the actuation lever 30 passes the first intermediate position (range). Then, the second microswitch SW2 further transitions to the "ON2" state when the actuation lever 30 has swung to the origin position, and thereby transmits the corresponding detection signal to the control part C1. The control part C1 determines that the tailgate 8 has been completely closed, and stops the drive source M1. Thus, the tailgate 8 is retained in the completely closed state by operation of the open/close mechanism 3.

Operation that Makes the Tailgate Openable

When the user opens the (closed) tailgate 8, the tailgate-opening-operation detecting part S1 transmits the information that the opening operation has been performed to the control part C1. The control part C1 determines that an opening operation for the tailgate 8 has been performed, thereby causing the drive source M1 to rotate reversely (i.e. the motor shaft rotates in the second rotational direction).

As shown in FIG. 17, the drive train 50 transmits the second driving force from the drive source M1 (i.e. the motor shaft that rotates in the second rotational direction) to the sector gear 35, thereby causing the actuation lever 30 to swing from the origin position in second direction R2.

Then, when the actuation lever 30 moves into the position range containing the second intermediate position, the second microswitch SW2 transitions to the "ON1" state and thereby transmits the corresponding detection signal to the control part C1. The control part C1 determines that the actuation lever 30 has started moving from the origin position toward the second actuation-end position.

When the actuation lever 30 swings in the position range containing the second intermediate position in second direction R2, the second operation portion 49 of the actuation lever 30 abuts on the force-receiving part 23 of the pawl 20, thereby causing the pawl 20 to swing from the blocking position to the non-blocking position. The stopper surface 20A is spaced apart from the latch surface 12A of the fork 10 radially outward of first axial center X1 and becomes unable to abut on the latch surface 12A.

Consequently, as shown in FIG. 18, the fork 10 swings from the latched position to the unlatched position and will not latch the striker 7 within the entry opening 97.

The first microswitch SW1 transitions to the "OFF" state and thereby transmits the corresponding detection signal to the control part C1. The control part C1 determines that the fork 10 has reached the unlatched position and that the fork 10 will not latch the striker 7 within the entry opening 97.

When the actuation lever 30 further swings in second direction R2 and reaches the second actuation-end position, the second microswitch SW2 transitions to the "OFF" state and thereby transmits the corresponding detection signal to the control part C1. The control part C1 causes the drive source M1 to rotate forwardly (i.e. the motor shaft rotates in the first rotational direction).

The drive train 50 transmits the first driving force from the drive source M1 (i.e. the motor shaft that rotates in the first rotational direction) to the sector gear 35, thereby causing the actuation lever 30 to swing from the second actuation-end position in first direction R1.

Then, the second microswitch SW2 transitions to the "ON1" state when the actuation lever 30 passes the second intermediate position (range). Then, the second microswitch SW2 transitions to the "ON2" state when the actuation lever 30 has further swung to the origin position, and thereby transmits the corresponding detection signal to the control part C1. The control part C1 determines that the tailgate 8 has become openable and stops the drive source M1. Thus, the retained state of the tailgate 8 is released and the tailgate 8 becomes openable by operation of the open/close mechanism 3.

Functions and Effects

In the lock apparatus 1 of the working example, as shown in FIG. 11 to FIG. 15, the drive train 50 of the open/close mechanism 3 transmits the first driving force from the drive source M1 (i.e. the motor shaft that rotates in the first rotational direction) to the sector gear of the actuation lever 30, thereby causing the actuation lever 30 to swing in first direction R1. Then, the first operation portion 39 of the actuation lever 30 abuts on the force-receiving surface 13 of the fork 10, thereby causing the fork 10 to swing from the half-latched position or a position slightly before the half-latched position to the latched position. This causes the pawl 20 to swing to the blocking position. Consequently, the tailgate 8 is retained in the completely closed state.

On the other hand, as shown in FIG. 16 to FIG. 18, the drive train 50 transmits the second driving force from the drive source M1 (i.e. the motor shaft that rotates in the second rotational direction) to the sector gear 35 of the actuation lever 30, thereby causing the actuation lever 30 to swing in second direction R2. Then, the second operation portion 49 of the actuation lever 30 abuts on the force-receiving part 23 of the pawl 20, thereby causing the pawl 20 to swing to the non-blocking position. Consequently, the retained state of the tailgate 8 is released and the tailgate 8 becomes openable.

In the lock apparatus 1 of the working example, the open/close mechanism 3 does not comprise elements equivalent to a second drive train, i.e., a pressing pin, an open lever, and a lift lever, which are required in the above-described known lock apparatus. Consequently, with the lock apparatus 1, it is possible to reduce the part count and the number of assembly steps.

Accordingly, with the lock apparatus 1 of the working example, it is possible to lower the manufacturing cost.

Additionally, in the lock apparatus 1, because the open/close mechanism 3 does not comprise elements equivalent to the second drive train, which are required in the above-mentioned known lock apparatus, it is possible to design the layout of the drive source M1 and the drive train 50 more freely. Consequently, it is possible to downsize the lock apparatus 1.

Furthermore, as shown in FIG. 7, the lock apparatus 1 further comprises the first support shaft 11 and the second support shaft 22. As shown in FIG. 6, the actuation lever comprises the sector gear 35, which meshes with the output gear 55 of the drive train 50, to which a first driving force or the second driving force is last transmitted. Furthermore, as shown in FIG. 6, FIG. 11, FIG. 12, and FIG. 16 to FIG. 18, when at least the actuation lever swings in second direction R2, the sector gear 35 becomes interposed between the first support shaft 11 and the second support shaft 22. Thus, when the actuation lever 30 swings in second direction R2, the second operation portion 49 causes the pawl 20 to swing to the non-blocking position more smoothly because the second operation portion 49 is positioned near the sector gear 35.

Additionally, in the lock apparatus 1, as shown in FIG. 6 and FIG. 17, the circumvention portion 37, which is recessed in first direction R1 so as to circumvent the striker 7 when the striker 7 enters the entry opening 97, is formed in (on) the actuation lever between the sector gear 35 and the first support shaft 11. Owing to this configuration, even if the actuation lever 30 is disposed such that it overlaps the striker 7 that is configured to enter the entry opening 97 in the direction in which the first support shaft 11 extends, the circumvention portion 37 will prevent the actuation lever 30 from interfering with the striker 7. Consequently, it is possible to downsize the lock apparatus 1 in the direction in which the first support shaft 11 extends.

Furthermore, in the lock apparatus 1, as shown in FIG. 5 to FIG. 7, the first support shaft 11 is provided projecting from the base member 90 and supports the fork 10 and the actuation lever 30 such that the fork 10 and the actuation lever 30 are swingable (pivotable). The upper-end portion of the first support shaft 11 is fixed to the backplate 95. The actuation lever 30, the fork 10 and the pawl 20 are located between the base member 90 and the backplate 95. This configuration makes it possible to downsize the lock apparatus 1 in the direction in which the first support shaft 11 extends, compared with a configuration in which the actuation lever 30 is not located between the base member 90 and the backplate 95. Additionally, owing to this configuration, the actuation lever 30 is firmly supported by the first support shaft 11, whose ends are respectively fixed to the base member 90 and the backplate 95. Consequently, the actuation lever 30 is unlikely to change its posture even when receiving a large force, thereby causing the first operation portion 39 to act on the fork stably and causing the second operation portion 49 to act on the pawl 20 stably.

Additionally, in the lock apparatus 1, as shown in FIG. 10A, FIG. 10B, and FIG. 10C, the first microswitch SW1 and the second microswitch SW2 are each a two-circuit microswitch. As shown in FIG. 11 to FIG. 18, the first microswitch SW1 is configured to detect that the fork 10 is at (in) any one of the positions selected from the latched position, the half-latched position, and the unlatched position. The second microswitch SW2 is configured to detect that the actuation lever 30 is at (in) any one of the positions selected from the origin position, the actuation-end positions, and the intermediate positions. Owing to this configuration, the control part C1 precisely determines, based on information transmitted from the first microswitch SW1 and the second microswitch SW2, the state (position) of the fork 10 and the state (position) of the actuation lever 30. In addition, this configuration makes it possible to reduce the part count and the number of assembly steps, compared with an assumed configuration in which two one-circuit microswitches were provided corresponding to the fork 10 and two one-circuit microswitches were provided corresponding to the actuation lever 30. Consequently, with the lock apparatus 1, it is possible to further lower the manufacturing cost.

Furthermore, as shown in FIG. 11 to FIG. 18, the lock apparatus 1 further comprises: the first detecting lever 71, which transmits the swinging (pivoting) movement of the fork 10 to the movable projection 83 of the first microswitch SW1; and the second detecting lever 72, which transmits the swinging (pivoting) movement of the actuation lever 30 to the movable projection 83 of the second microswitch SW2. This configuration makes it possible to design the layout of the first microswitch SW1 and the second microswitch SW2 more freely. Consequently, it is possible to downsize the lock apparatus 1.

The description above explained the present teachings based on the working example, but of course the present teachings are not limited to the above-mentioned working example and are applicable by modification where appropriate within a range that does not deviate from the gist thereof.

In the working example, the pawl 20 swings (pivots) between the blocking position and the non-blocking position, but the present teachings are not limited to this configuration. For example, the pawl may move linearly between the blocking position and the non-blocking position.

In the working example, the actuation lever 30 comprises the actuation-lever main body 31 and the cam 40, but the present teachings are not limited to this configuration. For example, the actuation lever may be a single (integrated) member.

The first detecting lever 71 and the second detecting lever 72 according to the working example are not essential. For example, the first microswitch may directly detect the position of the fork, and/or the second microswitch may directly detect the position of the actuation lever.

The present teachings also include a configuration in which the working example is modified such that an idle gear, which meshes with the sector gear 35, is provided on the lock-apparatus main body 5, the idle gear is modified to transmit the first driving force or the second driving force from the output gear 55 to the sector gear 35, and the idle gear is set to be an output gear of the drive train 50, to which the first driving force or the second driving force is last transmitted, instead of the output gear 55.

In the working example, the base member 90 is provided on the tailgate 8, and the striker 7 is provided on the vehicle body 9; however, the present teachings are not limited to this configuration. For example, the present teachings also include a configuration in which the base member is provided on the vehicle body, and the striker is provided on the open/close body.

In the working example, the lock apparatus 1 is used in the tailgate 8, but the present teachings are not limited to this configuration. For example, the lock apparatus according to the present teachings may be used in a swinging (hinged) or sliding side door, a trunk lid, or the like that is provided on a side or rear surface of a vehicle.

The present teachings are applicable to, for example, vehicles such as an automobile, an industrial vehicle, such as a truck or lorry, or the like.

As used herein, the terms “swing” and “swingable” are intended to be synonymous with and/or have the same meaning as “pivot” and “pivotable”, respectively, such that these terms are interchangeable.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vehicle door lock apparatuses and methods for manufacturing and operating the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Lock apparatus
8 Vehicle open/close body (tailgate)
9 Vehicle body
7 Striker
97 Entry opening
90 Base member
10 Fork
20 Pawl
3 Open/close mechanism
M1 Drive source
R1 First direction
R2 Second direction
30 Actuation lever
50 Drive train
39 First operation portion
49 Second operation portion
11 First support shaft
22 Second support shaft
55 Output gear
35 Sector gear
37 Circumvention portion
95 Backplate
SW1 First microswitch
SW2 Second microswitch
83 Movable projection
L1 First stroke amount
81 First circuit
L2 Second stroke amount
82 Second circuit

71 First detecting lever

72 Second detecting lever

The invention claimed is:

1. A lock apparatus for a vehicle open/close body comprising:

a base member that is provided on one of a vehicle body and an open/close body, which is provided on the vehicle body in an openable and closable manner, and that has an entry opening configured to receive a striker, which is fixed to the other of the vehicle body and the open/close body;

a fork that is provided on the base member and configured to swing in a swing range that includes: a latched position, at which the striker is at the deep end of the entry opening and at which the striker is latchable; a half-latched position, at which the striker is midway in the entry opening and at which the striker is latchable; and an unlatched position, at which the striker is within the entry opening and at which the striker will not latch;

a pawl that is provided on the base member and is displaceable to: a blocking position, at which the fork is blocked from swinging to the unlatched position; and a non-blocking position, at which the fork is allowed to swing to the unlatched position;

an open/close mechanism configured to: displace the pawl to the non-blocking position in response to the open/close mechanism acting on the pawl, and cause the fork to swing to the latched position in response to the open/close mechanism acting on the fork;

a first microswitch; and a second microswitch;

wherein:

the open/close mechanism comprises:

a drive source configured to generate a first driving force by rotating in a forward direction and a second driving force by rotating in a reverse direction;

an actuation lever, which is supported on the base member coaxial with the fork and is swingable in a first direction and in a second direction, which is opposite of the first direction, independently of the fork; and a drive train configured to cause the actuation lever to swing: in the first direction in response to transmitting the first driving force from the drive source to the actuation lever, and in the second direction in response to transmitting the second driving force from the drive source to the actuation lever;

the actuation lever comprises:

a first operation portion that, when swung in the first direction, abuts on the fork and causes the fork to swing to the latched position; and a second operation portion that, when swung in the second direction, abuts on the pawl and displaces the pawl to the non-blocking position;

the first microswitch and the second microswitch each comprise:

a movable projection configured to be pushed in;

a first circuit, which switches between connection and disconnection at a first stroke amount, by which the movable projection is pressed in; and a second circuit, which switches between connection and disconnection at a second stroke amount, by which the movable projection is pressed in further from the first stroke amount;

the first microswitch is configured to detect when the fork is at the latched position, at the half-latched position, and at the unlatched position; and the actuation lever is swingable in a swinging range that includes:

an origin position;

a first actuation-end position, which is a first limit position when swinging from the origin position in the first direction;

a second actuation-end position, which is a second limit position when swinging from the origin position in the second direction;

a first intermediate position, which is between the origin position and the first actuation-end position; and a second intermediate position, which is between the origin position and the second actuation-end position;

with the proviso that the first actuation-end position and the second actuation-end position are collectively referred to as actuation-end positions and the first intermediate position and the second intermediate position are collectively referred to as intermediate positions, the second microswitch is configured to detect when the actuation lever is one of at the origin position, at the actuation-end positions, and at the intermediate positions.

2. The lock apparatus according to claim 1, further comprising:

a first support shaft, which projects from the base member and supports the fork and the actuation lever in a swingable manner; and a second support shaft, which projects from the base member and supports the pawl in a swingable manner;

wherein:

the actuation lever comprises a sector gear that meshes with an output gear of the drive train, to which the first driving force or the second driving force is last transmitted; and the sector gear is configured to become interposed between the first support shaft and the second support shaft in response to at least the actuation lever swinging in the second direction.

3. The lock apparatus according to claim 2, wherein a circumvention portion, which is recessed in the first direction so as to circumvent the striker when the striker is entering the entry opening, is formed in or on the actuation lever between the sector gear and the first support shaft.

4. The lock apparatus according to claim 3, further comprising:

a backplate, which opposes the base member and to which end portions of the first and second support shafts on the side opposite the base member are fixed;

wherein the actuation lever, the fork and the pawl are located between the base member and the backplate.

5. The lock apparatus according to claim 4, further comprising:

a first detecting lever that is swingable between the movable projection of the first microswitch and the fork to transmit pivoting movement of the fork to the movable projection of the first microswitch; and a second detecting lever that is swingable between the movable projection of the second microswitch and the actuation lever to transmit pivoting movement of the actuation lever to the movable projection of the second microswitch.

6. The lock apparatus according to claim 1, further comprising:

a first support shaft, which projects from the base member and supports the fork and the actuation lever in a swingable manner; and a backplate, which opposes the base member and to which an end portion of the first support shaft on the side opposite the base member is fixed;

wherein the actuation lever, the fork and the pawl are located between the base member and the backplate.

7. The lock apparatus according to claim 1, further comprising:

a first detecting lever, which is provided in a swingable manner between the movable projection of the first microswitch and the fork and is configured to transmit swinging movement of the fork to the movable projection of the first microswitch; and a second detecting lever, which is provided in a swingable manner between the movable projection of the second microswitch and the actuation lever and is configured to transmit swinging movement of the actuation lever to the movable projection of the second microswitch.

8. A vehicle lock apparatus comprising:

a base member configured to be affixed to one of a vehicle body and an open/close body, which is provided on the vehicle body in an openable and closable manner, the base member having an entry opening configured to receive a striker, which is affixed to the other of the vehicle body and the open/close body;

a fork provided on the base member and having a pivoting range that includes: a latched position, at which the striker is at the deep end of the entry opening and at which the striker is latchable; a half-latched position, at which the striker is midway in the entry opening and at which the striker is latchable; and an unlatched position, at which the striker is within the entry opening and at which the striker is not latchable;

a pawl provided on the base member and being displaceable to: a blocking position, at which the fork is blocked from pivoting to the unlatched position; and a non-blocking position, at which the fork is pivotable to the unlatched position;

an open/close mechanism configured to displace the pawl to the non-blocking position in response to the open/close mechanism acting on the pawl and to cause the fork to pivot to the latched position in response to the open/close mechanism acting on the fork;

a first microswitch; and a second microswitch;

wherein:

the open/close mechanism comprises:

a drive source configured to generate a first driving force and a second driving force that is opposite of the first driving force;

an actuation lever supported on the base member coaxial with the fork, the actuation lever being pivotable, independently of the fork, in a first direction and in a second direction, which is opposite of the first direction; and a drive train configured to cause the actuation lever to pivot in the first direction in response to the drive source outputting the first driving force, and to cause the actuation lever to pivot in the second direction in response to the drive source outputting the second driving force;

the actuation lever comprises:

a first operation portion configured such that that, in response to the actuation lever pivoting in the first direction, the first operation portion abuts on the fork and causes the fork to pivot to the latched position; and a second operation portion configured such that that, in response to the actuation lever pivoting in the second direction, the second operation portion abuts on the pawl and displaces the pawl to the non-blocking position;

the first microswitch and the second microswitch each comprise:

a housing;

a movable projection configured to be pushed inward towards an interior space of the housing by a first stroke amount and by a second stroke amount that is greater than the first stroke amount;

a first circuit configured to switch between connection and disconnection in response to the movable projection being pushed into the interior space by the first stroke amount; and a second circuit configured to switch between connection and disconnection in response to the movable projection being pushed into the interior space by the second stroke amount;

the first microswitch is configured to detect when the fork is at the latched position, at the half-latched position, and at the unlatched position; and the actuation lever is pivotable in a pivoting range that includes:

an origin position;

a first actuation-end position, which is a first limit for pivoting of the actuation lever away from the origin position in the first direction;

a second actuation-end position, which is a second limit for pivoting of the actuation lever away from the origin position in the second direction;

a first intermediate position disposed between the origin position and the first actuation-end position in the pivoting range; and a second intermediate position disposed between the origin position and the second actuation-end position in the pivoting range;

with the proviso that the first actuation-end position and the second actuation-end position are collectively referred to as actuation-end positions and the first intermediate position and the second intermediate position are collectively referred to as intermediate positions, the second microswitch is configured to detect when the actuation lever is one of at the origin position, at the actuation-end positions, and at the intermediate positions.

9. The vehicle lock apparatus according to claim 8, further comprising:

a first support shaft projecting from the base member and pivotably supporting the fork and the actuation lever; and a second support shaft projecting from the base member and pivotably supporting the pawl;

wherein:

the actuation lever comprises a sector gear that meshes with an output gear of the drive train, to which the first driving force or the second driving force is last transmitted; and the sector gear is configured such that, in response to at least the actuation lever pivoting in the second direction, at least a portion of the sector gear interposes between the first support shaft and the second support shaft.

10. The vehicle lock apparatus according to claim 9, wherein:

a circumvention portion is defined in or on the actuation lever between the sector gear and the first support shaft, and the circumvention portion is recessed in the first direction such that the actuation lever circumvents the striker in a state in which the striker has entered the entry opening.

11. The vehicle lock apparatus according to claim 8, further comprising:

a first support shaft projecting from the base member and pivotably supporting the fork and the actuation lever; and a backplate, which opposes the base member and to which an end portion of the first support shaft on the side opposite the base member is affixed;

wherein the actuation lever, the fork and the pawl are located between the base member and the backplate.

12. The vehicle lock apparatus according to claim 8, further comprising:

a first detecting lever that is pivotable between the movable projection of the first microswitch and the fork and is configured to transmit pivoting movement of the fork to the movable projection of the first microswitch; and a second detecting lever that is swingable between the movable projection of the second microswitch and the actuation lever and is configured to transmit pivoting movement of the actuation lever to the movable projection of the second microswitch.

13. The vehicle lock apparatus according to claim 12, further comprising:

a first support shaft projecting from the base member and pivotably supporting the fork and the actuation lever; and a second support shaft projecting from the base member and pivotably supporting the pawl;

wherein:

the actuation lever comprises a sector gear that meshes with an output gear of the drive train, to which the first driving force or the second driving force is last transmitted; and the sector gear is configured such that, in response to at least the actuation lever pivoting in the second direction, at least a portion of the sector gear interposes between the first support shaft and the second support shaft.

14. The vehicle lock apparatus according to claim 13, wherein:

a circumvention portion is defined in or on the actuation lever between the sector gear and the first support shaft, and the circumvention portion is recessed in the first direction such that the actuation lever circumvents the striker in a state in which the striker has entered the entry opening.

15. The lock apparatus according to claim 14, wherein the open/close body is selected from the group consisting of a tailgate, a barn door, a side door, and a trunk lid.

16. The lock apparatus according to claim 15, wherein the open/close body is a tailgate hinged to the vehicle body.

17. A vehicle, comprising:

a vehicle body;

an open/close body configured as a tailgate, a barn door, a side door or a trunk lid; and the lock apparatus according to claim 10, wherein the base member is affixed to one of the vehicle body and the open/close body and the striker is affixed to the other of the vehicle body and the open/close body.

18. A lock apparatus for a vehicle open/close body comprising:

a base member that is provided on one of a vehicle body and an open/close body, which is provided on the vehicle body in an openable and closable manner, and that has an entry opening configured to receive a striker, which is fixed to the other of the vehicle body and the open/close body;

a fork that is provided on the base member and configured to swing in a swing range that includes: a latched position, at which the striker is at the deep end of the entry opening and at which the striker is latchable; a half-latched position, at which the striker is midway in the entry opening and at which the striker is latchable; and an unlatched position, at which the striker is within the entry opening and at which the striker will not latch;

a pawl that is provided on the base member and is displaceable to: a blocking position, at which the fork is blocked from swinging to the unlatched position; and a non-blocking position, at which the fork is allowed to swing to the unlatched position;

an open/close mechanism configured to: displace the pawl to the non-blocking position in response to the open/close mechanism acting on the pawl, and cause the fork to swing to the latched position in response to the open/close mechanism acting on the fork;

a first support shaft, which projects from the base member and supports the fork and the actuation lever in a swingable manner; and a second support shaft, which projects from the base member and supports the pawl in a swingable manner;

wherein:

the open/close mechanism comprises:

a drive source configured to generate a first driving force by rotating in a forward direction and a second driving force by rotating in a reverse direction;

an actuation lever, which is supported on the base member coaxial with the fork and is swingable in a first direction and in a second direction, which is opposite of the first direction, independently of the fork; and a drive train configured to cause the actuation lever to swing: in the first direction in response to transmitting the first driving force from the drive source to the actuation lever, and in the second direction in response to transmitting the second driving force from the drive source to the actuation lever;

the actuation lever comprises:

a first operation portion that, when swung in the first direction, abuts on the fork and causes the fork to swing to the latched position;

a second operation portion that, when swung in the second direction, abuts on the pawl and displaces the pawl to the non-blocking position; and a sector gear having a plurality of teeth that mesh with an output gear of the drive train, to which the first driving force or the second driving force is last transmitted; and the sector gear is configured such that a portion of the plurality of teeth become interposed between the first support shaft and the second support shaft in response to at least the actuation lever swinging in the second direction.

19. The lock apparatus according to claim 18, wherein the actuation lever comprises:

an actuation-lever main body that comprises the first operation portion and the sector gear; and a cam integrally coupled with the actuation-lever main body and positioned adjacent to the actuation-lever main body in a direction in which the first support shaft and the second support shaft extend, the cam comprising the second operation portion.

20. The lock apparatus according to claim 19, wherein the cam is composed of a resin.

21. A vehicle lock apparatus comprising:

a base member configured to be affixed to one of a vehicle body and an open/close body, which is provided on the vehicle body in an openable and closable manner, the base member having an entry opening configured to receive a striker, which is affixed to the other of the vehicle body and the open/close body;

a fork provided on the base member and having a pivoting range that includes: a latched position, at which the striker is at the deep end of the entry opening and at which the striker is latchable; a half-latched position, at which the striker is midway in the entry opening and at which the striker is latchable; and an unlatched position, at which the striker is within the entry opening and at which the striker is not latchable;

a pawl provided on the base member and being displaceable to: a blocking position, at which the fork is blocked from pivoting to the unlatched position; and a non-blocking position, at which the fork is pivotable to the unlatched position;

an open/close mechanism configured to displace the pawl to the non-blocking position in response to the open/close mechanism acting on the pawl and to cause the fork to pivot to the latched position in response to the open/close mechanism acting on the fork;

a first support shaft projecting from the base member and pivotably supporting the fork and the actuation lever; and a second support shaft projecting from the base member and pivotably supporting the pawl;

wherein:

the open/close mechanism comprises:

a drive source configured to generate a first driving force and a second driving force that is opposite of the first driving force;

an actuation lever supported on the base member coaxial with the fork, the actuation lever being pivotable, independently of the fork, in a first direction and in a second direction, which is opposite of the first direction; and a drive train configured to cause the actuation lever to pivot in the first direction in response to the drive source outputting the first driving force, and to cause the actuation lever to pivot in the second direction in response to the drive source outputting the second driving force;

the actuation lever comprises:

a first operation portion configured such that that, in response to the actuation lever pivoting in the first direction, the first operation portion abuts on the fork and causes the fork to pivot to the latched position;

a second operation portion configured such that that, in response to the actuation lever pivoting in the second direction, the second operation portion abuts on the pawl and displaces the pawl to the non-blocking position; and a sector gear having a plurality of teeth that mesh with an output gear of the drive train, to which the first driving force or the second driving force is last transmitted; and the sector gear is configured such that, in response to at least the actuation lever pivoting in the second direction, at least a portion of the plurality of teeth of the sector gear interposes between the first support shaft and the second support shaft.

22. The lock apparatus according to claim 21, wherein the actuation lever comprises:

an actuation-lever main body that comprises the first operation portion and the sector gear; and a cam integrally coupled with the actuation-lever main body and positioned adjacent to the actuation-lever main body in a direction in which the first support shaft and the second support shaft extend, the cam comprising the second operation portion.

23. The lock apparatus according to claim 22, wherein the cam is composed of a resin.

* * * * *